(12) United States Patent
Lee et al.

(10) Patent No.: US 11,979,555 B2
(45) Date of Patent: May 7, 2024

(54) METHOD AND APPARATUS FOR DERIVING INTRA-PREDICTION MODE

(71) Applicant: Electronics and Telecommunications Research Institute, Daejeon (KR)

(72) Inventors: Jin Ho Lee, Daejeon (KR); Jung Won Kang, Daejeon (KR); Ha Hyun Lee, Seoul (KR); Sung Chang Lim, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

(21) Appl. No.: 17/418,514

(22) PCT Filed: Dec. 27, 2019

(86) PCT No.: PCT/KR2019/018576
§ 371 (c)(1),
(2) Date: Jun. 25, 2021

(87) PCT Pub. No.: WO2020/139006
PCT Pub. Date: Jul. 2, 2020

(65) Prior Publication Data
US 2022/0086426 A1    Mar. 17, 2022

(30) Foreign Application Priority Data

Dec. 28, 2018 (KR) ........................ 10-2018-0172705
Jan. 2, 2019 (KR) ........................ 10-2019-0000320
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/11;
(Continued)

(56) References Cited

U.S. PATENT DOCUMENTS

2018/0084268 A1    3/2018 Park
2020/0036970 A1*   1/2020 Yoo ..................... H04N 19/117
(Continued)

FOREIGN PATENT DOCUMENTS

CN    107925759 A    4/2018
KR    101336578 B1   12/2013
(Continued)

*Primary Examiner* — Hesham K Abouzahra
(74) *Attorney, Agent, or Firm* — BROADVIEW IP LAW, PC

(57) ABSTRACT

Disclosed herein is a method of decoding an image including deriving intra prediction mode of a current block using an intra prediction mode of a neighbor block adjacent to the current block, constructing a reference sample of the current block, and performing intra prediction with respect to the current block using the intra prediction mode of the current block and the reference sample. The deriving of the intra prediction mode of the current block includes constructing a most probable mode (MPM) list based on whether the intra prediction mode of the current block is a Planar mode.

4 Claims, 19 Drawing Sheets

(30) Foreign Application Priority Data

Feb. 7, 2019 (KR) .......................... 10-2019-0014463
Mar. 25, 2019 (KR) .......................... 10-2019-0033328

(51) Int. Cl.
*H04N 19/159* (2014.01)
*H04N 19/176* (2014.01)

(58) Field of Classification Search
CPC .. H04N 19/157; H04N 19/463; H04N 19/593;
H04N 19/139; H04N 19/122; H04N
19/109; H04N 19/119; H04N 19/186
See application file for complete search history.

(56) References Cited

U.S. PATENT DOCUMENTS

2022/0038691 A1* 2/2022 Li .......................... H04N 19/176
2023/0319266 A1* 10/2023 Wang .................. H04N 19/463
375/240.03

FOREIGN PATENT DOCUMENTS

| KR | 1020150043226 A | 4/2015 |
| KR | 1020160143588 A | 12/2016 |
| KR | 1020180014674 A | 2/2018 |
| KR | 1020180121402 A | 11/2018 |
| WO | 2018/026148 A1 | 2/2018 |
| WO | 2018/199675 A1 | 11/2018 |
| WO | 2018/221817 A1 | 12/2018 |

\* cited by examiner

| | |
|---|---|
| mh_intra_flag[ x0 ][ y0 ] | ae(v) |
| if( mh_intra_flag[ x0 ][ y0 ] ) { | |
|   mh_intra_luma_mode[ x0 ][ y0 ] | ae(v) |

(a)

(b)

METHOD AND APPARATUS FOR DERIVING INTRA-PREDICTION MODE

TECHNICAL FIELD

The present invention relates to an image encoding/decoding method and apparatus, and a recording medium storing a bitstream. More particularly, the present invention relates to a method and apparatus for encoding/decoding an image using intra prediction, and a recording medium storing a bitstream generated by the method or apparatus for encoding the image of the present invention.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved compression efficiency.

Another object of the present invention is to provide an image encoding/decoding method and apparatus using intra prediction with improved compression efficiency.

Another object of the present invention is to provide a recording medium storing a bitstream generated by an image encoding/decoding method or apparatus of the present invention.

Technical Solution

According to the present invention, provided is a method of method of decoding an image including deriving intra prediction mode of a current block using an intra prediction mode of a neighbor block adjacent to the current block, constructing a reference sample of the current block, and performing intra prediction with respect to the current block using the intra prediction mode of the current block and the reference sample, wherein the deriving of the intra prediction mode of the current block includes constructing a most probable mode (MPM) list based on whether the intra prediction mode of the current block is a Planar mode.

The intra prediction mode of the neighbor block may be replaced by a Planar mode, when the intra prediction mode of the neighbor block is not available.

The neighbor block may be at least one of a left lower block or a right upper block of the current block.

The MPM list may be constructed by the same method, regardless of multi reference sample line related information, subblock partition prediction information and intra/inter combination prediction related information.

The construction of the MPM list may include deriving intra prediction modes of a plurality of neighbor blocks adjacent to the current block, and constructing the MPM list based on at least one of whether the intra prediction modes of the plurality of neighbor blocks are equal to each other or whether the intra prediction modes of the plurality of neighbor blocks are directional.

The construction of the MPM list may include deriving intra prediction modes of a plurality of neighbor blocks adjacent to the current block, selecting a mode corresponding to a maximum value from among the derived intra prediction modes of the neighbor blocks, and constructing the MPM list to include a mode corresponding to the maximum value.

The construction of the MPM list may include deriving intra prediction modes of a plurality of neighbor blocks adjacent to the current block, selecting a mode corresponding to a maximum value and a mode corresponding to a minimum value from among the derived intra prediction modes of the neighbor blocks, and constructing the MPM list including the mode corresponding to the maximum value and the mode corresponding to the minimum value. The MPM list may be constructed to further include an additional mode derived by adding a predetermined offset to the mode corresponding to the maximum value or the mode corresponding to the minimum value.

A method of deriving the additional mode may be differently determined depending on whether a difference between the maximum value and the minimum value is a predetermined value.

The predetermined value may be at least one of 1, 2 or 61.

The current block may be partitioned into a predetermined number of subblocks based on at least one of a size or a shape of the current block.

According to the present invention, provided is a method of encoding an image including determining an intra prediction mode of a current block, constructing a reference sample of the current block, performing intra prediction of the current block using the intra prediction mode and the reference sample, and encoding the intra prediction mode of the current block using an intra prediction mode of a neighbor block adjacent to the current block, wherein the encoding of the intra prediction mode of the current block includes constructing a most probable mode (MPM) list based on whether the intra prediction mode of the current block is a Planar mode.

The intra prediction mode of the neighbor block may be replaced by a Planar mode, when the intra prediction mode of the neighbor block is not available.

The neighbor block may be at least one of a left lower block or a right upper block of the current block.

The MPM list may be constructed by the same method, regardless of multi reference sample line related information, subblock partition prediction information and intra/inter combination prediction related information.

The construction of the MPM list may include deriving intra prediction modes of a plurality of neighbor blocks adjacent to the current block, and constructing the MPM list based on at least one of whether the intra prediction modes of the plurality of neighbor blocks are equal to each other or whether the intra prediction modes of the plurality of neighbor blocks are directional.

The construction of the MPM list may include deriving intra prediction modes of a plurality of neighbor blocks adjacent to the current block, selecting a mode corresponding to a maximum value from among the derived intra prediction modes of the neighbor blocks, and constructing the MPM list to include a mode corresponding to the maximum value.

The construction of the MPM list may include deriving intra prediction modes of a plurality of neighbor blocks adjacent to the current block, selecting a mode corresponding to a maximum value and a mode corresponding to a minimum value from among the derived intra prediction modes of the neighbor blocks, and constructing the MPM list including the mode corresponding to the maximum value and the mode corresponding to the minimum value. The MPM list may be constructed to further include an additional mode derived by adding a predetermined offset to the mode corresponding to the maximum value or the mode corresponding to the minimum value.

A method of deriving the additional mode may be differently determined depending on whether a difference between the maximum value and the minimum value is a predetermined value.

The predetermined value may be at least one of 1, 2 or 61.

According to the present invention, provided is a non-transitory computer-readable recording medium storing a bitstream used to reconstruct an image received and decoded by an image decoding device, wherein the bitstream includes information on prediction of a current block, wherein the information on prediction of the current block is used to derive an intra prediction mode of the current block using an intra prediction mode of a neighbor block adjacent to the current block and construct a reference sample of the current block, wherein the intra prediction mode of the current block and the reference sample are used to perform intra prediction of the current block, and wherein a most probable mode (MPM) list used to derive the intra prediction mode of the current block is constructed depending on whether the intra prediction mode of the current block is a Planar mode.

The recording medium according to the present invention may store a bitstream generated by the image encoding method according to the present invention.

Advantageous Effects

According to the present invention, it is possible to provide an image encoding/decoding method and apparatus with improved compression efficiency.

According to the present invention, it is possible to provide an image encoding/decoding method and apparatus using intra prediction with improved compression efficiency.

According to the present invention, it is possible to provide a recording medium storing a bitstream generated by an image encoding/decoding method or apparatus of the present invention.

MODE FOR INVENTION

Figure 1:
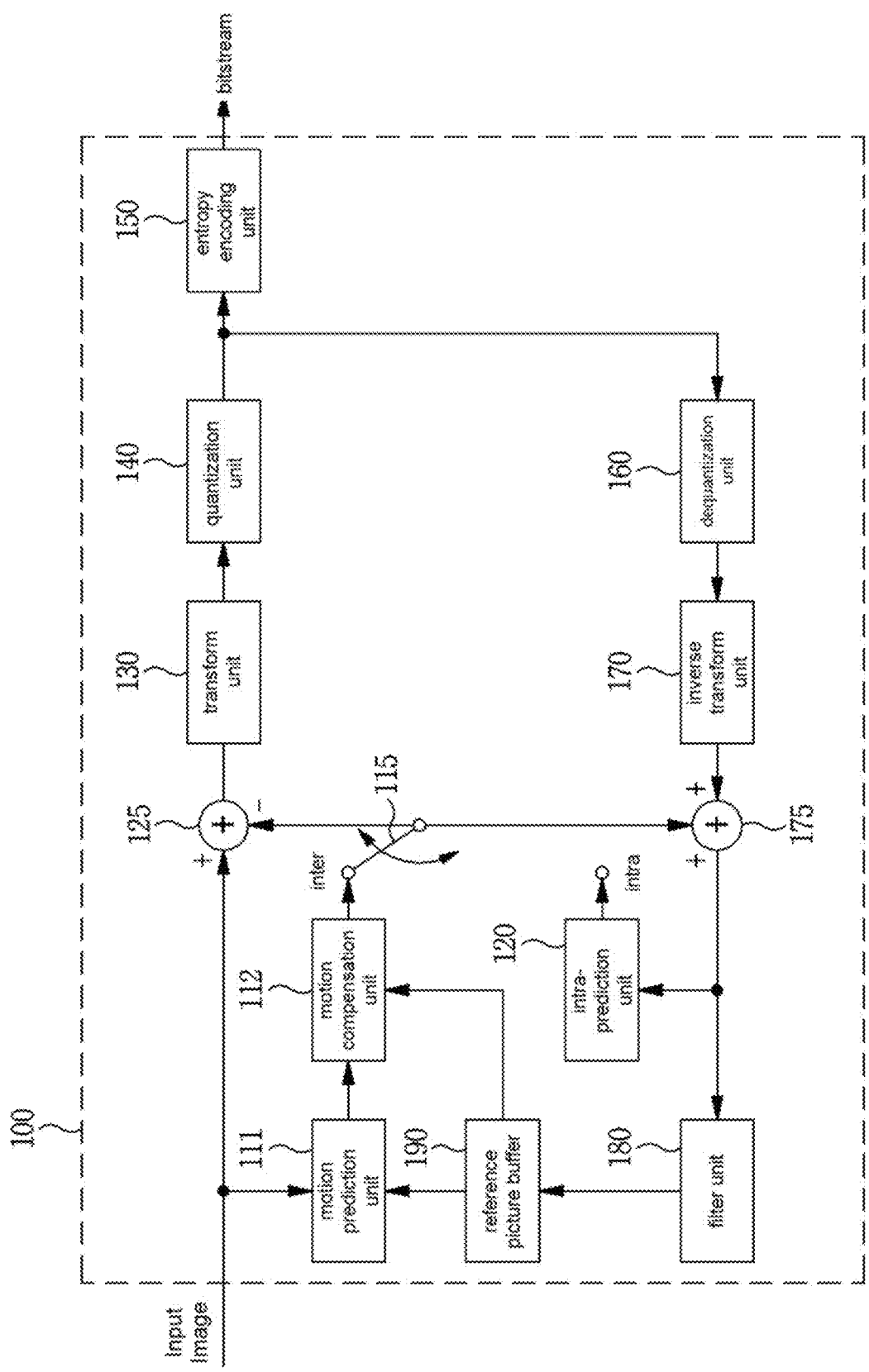
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first'. 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including". "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block, is an M×N array of a sample. Herein. M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad tree form, whether to partition of a binary tree form, a partition direction of a binary tree form (horizontal direction or vertical direction), a partition form of a binary tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
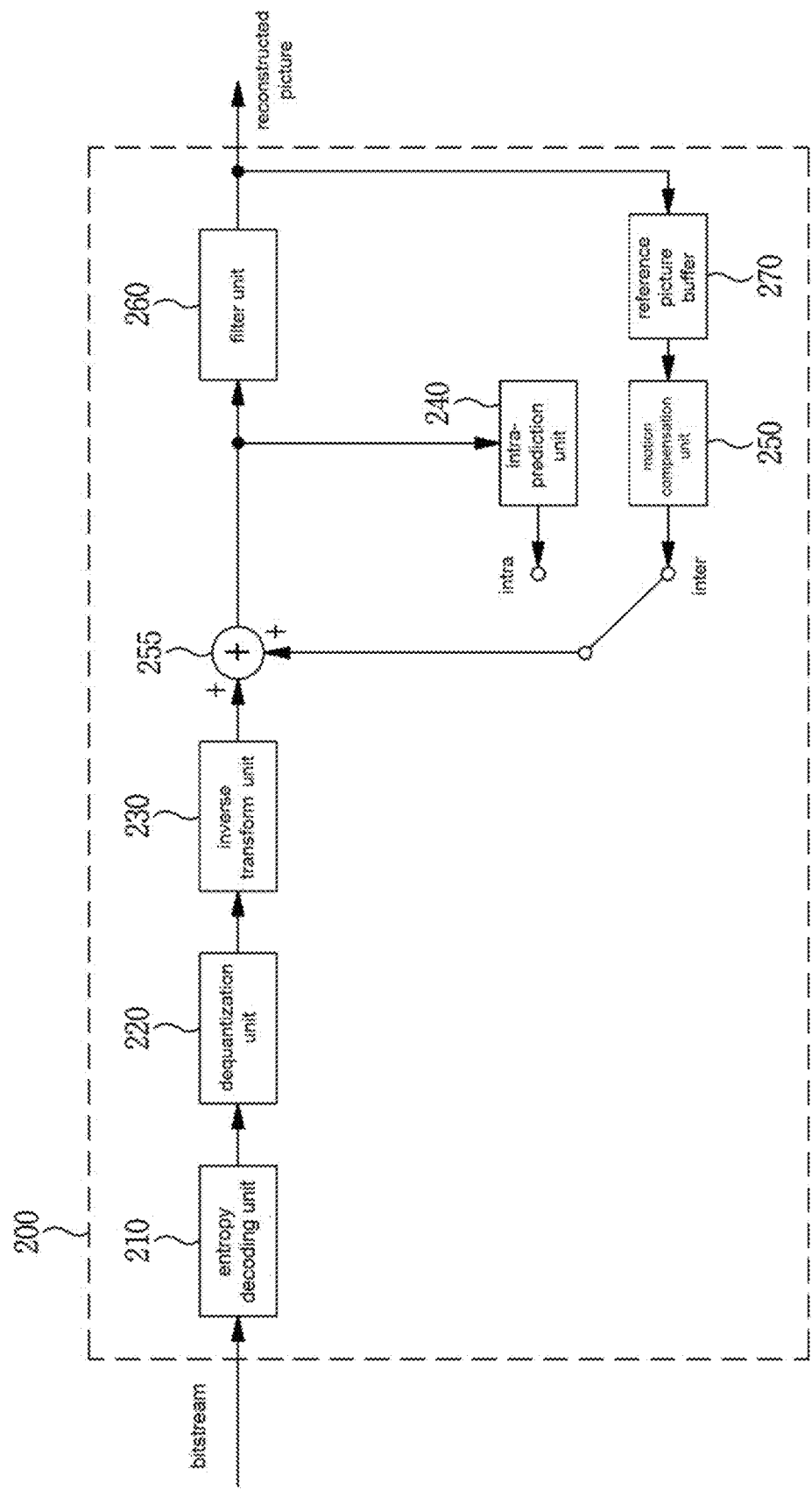
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
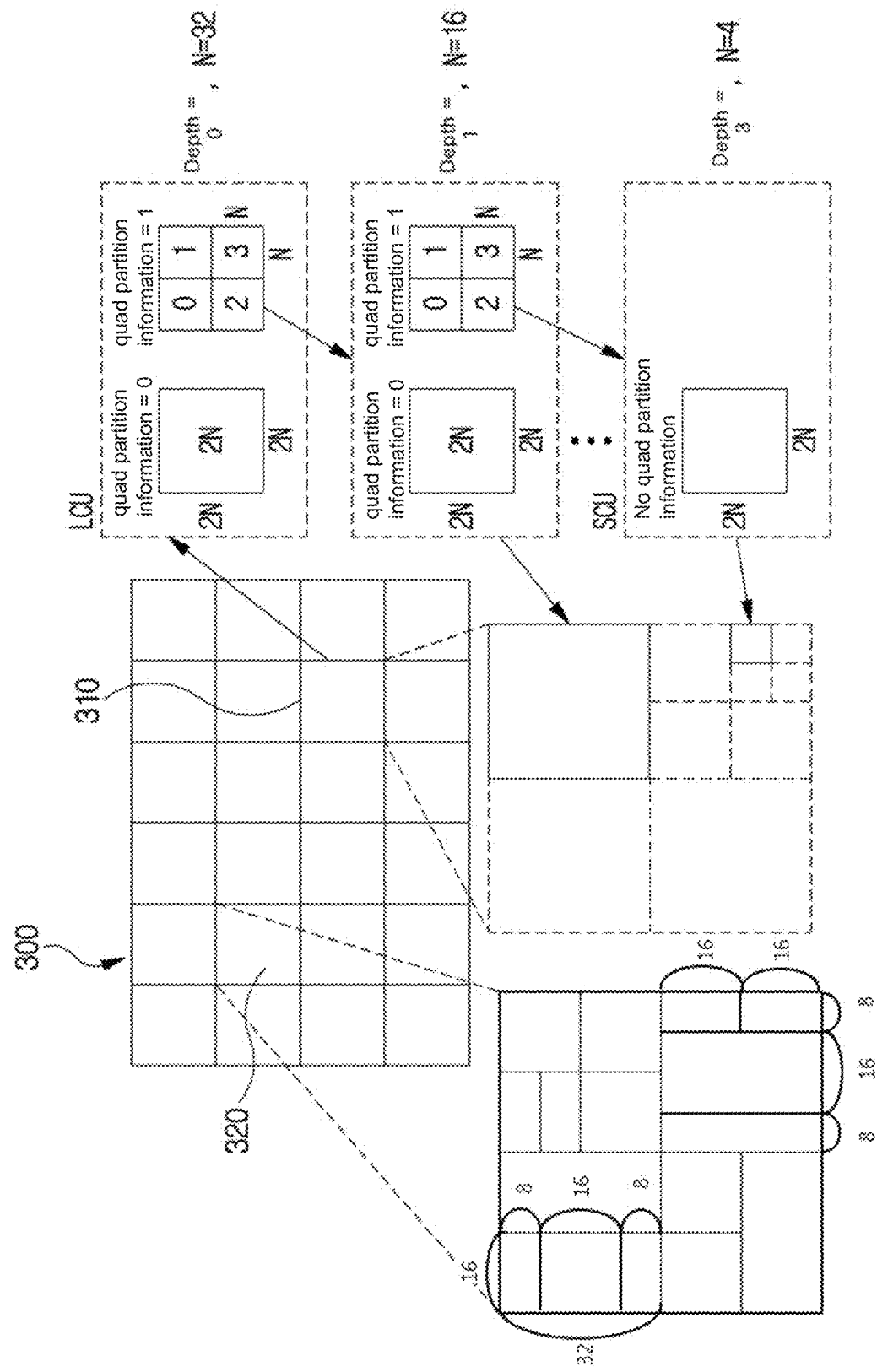
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 3264 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

- N×M (N and/or M is 128) Ternary tree partitioning for coding units
- 128×N (N<=64) Binary tree partitioning in horizontal direction for coding units
- N×128 (N<=64) Binary tree partitioning in vertical direction for coding units Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
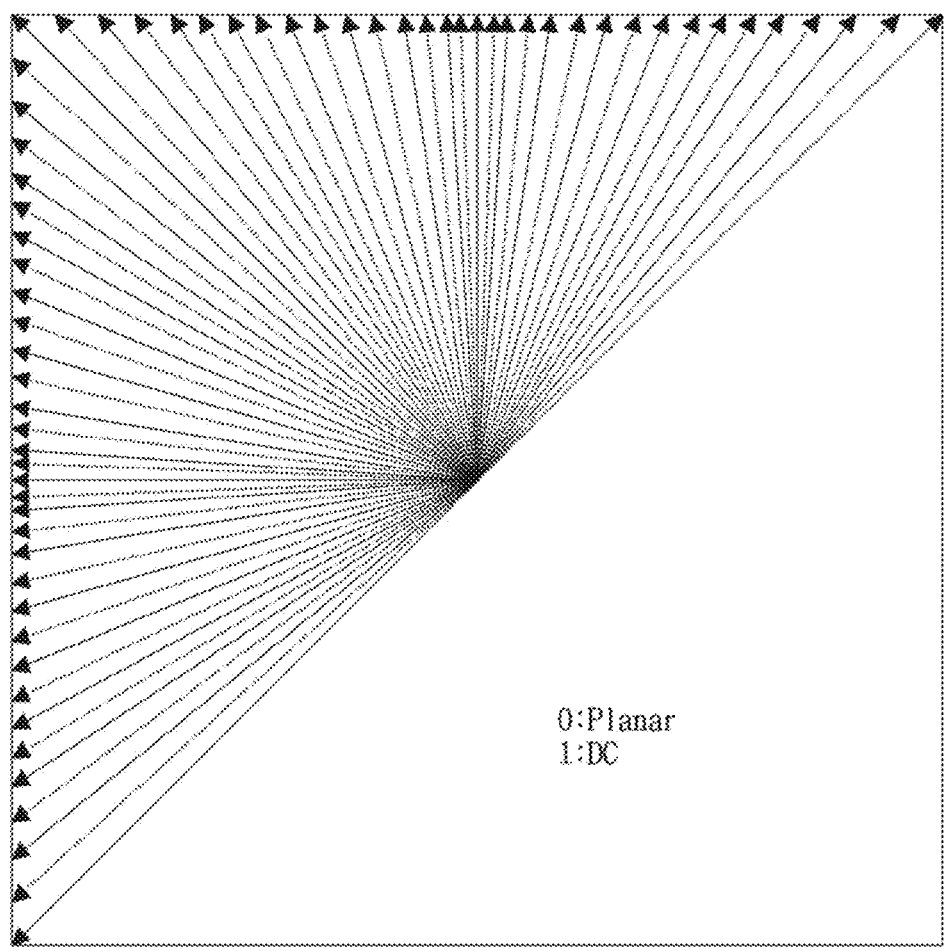
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed to neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
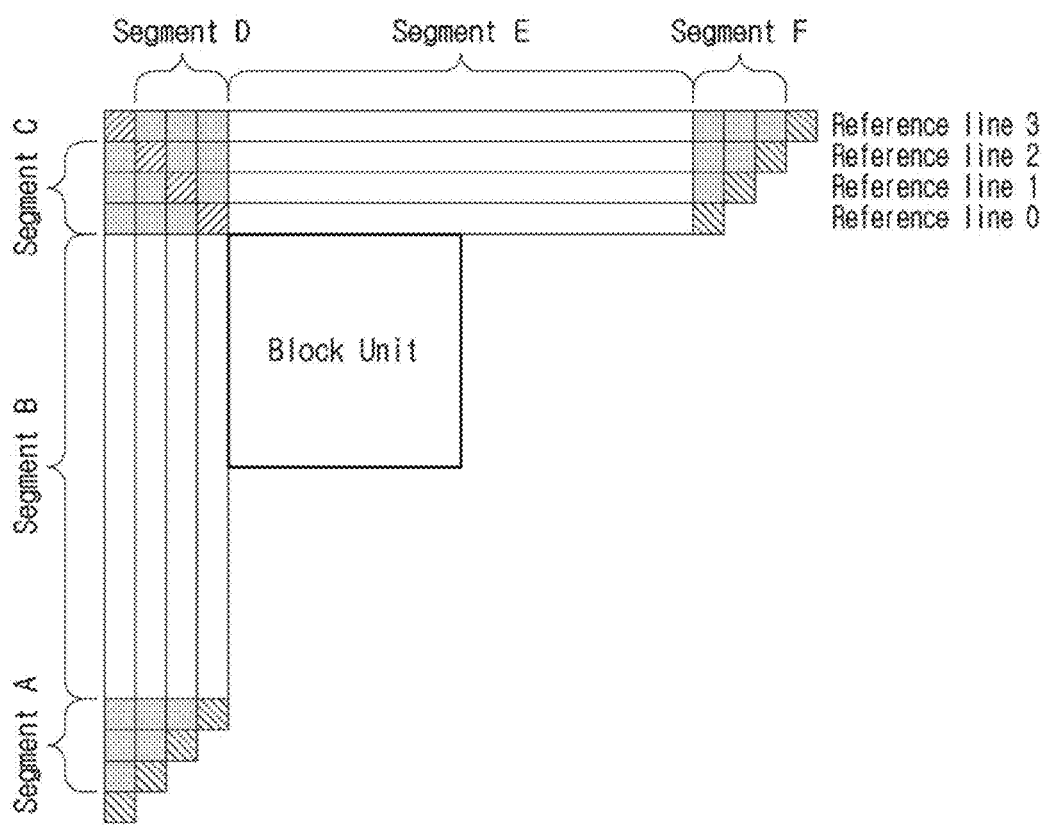
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
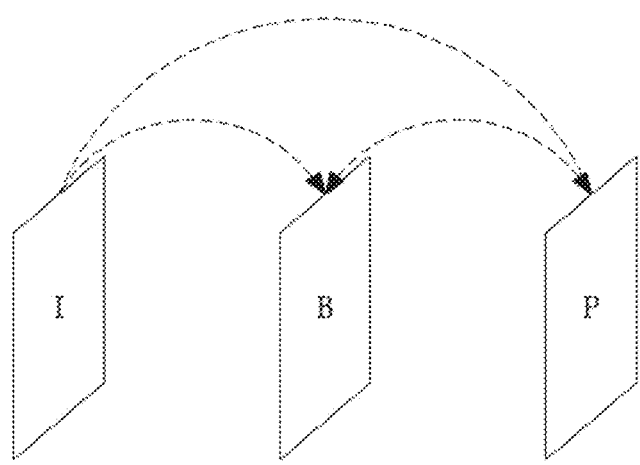
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
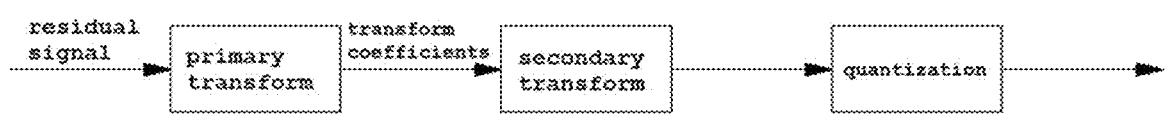
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
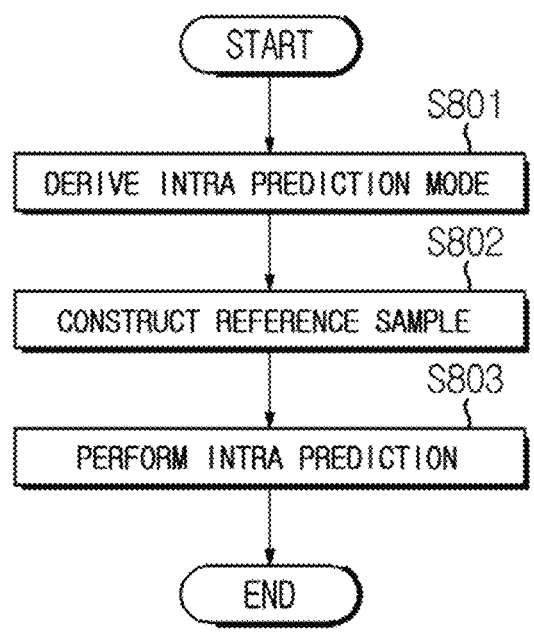
FIG. 8 is a flowchart illustrating an intra prediction process according to an embodiment of the present invention.

FIG. 8 is a flowchart illustrating an intra prediction process according to an embodiment of the present invention.

The intra prediction process of a current block may include step S801 of deriving an intra prediction mode, step S802 of constructing a reference sample and/or step S803 of performing intra prediction.

In step S801, the intra prediction mode of the current block may be derived. The intra prediction mode of the current block may be derived using a method of using an intra prediction mode of a neighbor block, a method of entropy-encoding/decoding the intra prediction mode of the current block from a bitstream, a method of using an encoding parameter of a neighbor block or a method of using an intra prediction mode of a color component. Additionally, a first directional mode may be changed to a second directional mode based on at least one of the intra prediction mode or the size/shape of the current block.

In step S802, the reference sample may be constructed by performing at least one of reference sample selection, reference sample padding or reference sample filtering.

In step S803, intra prediction may be performed by performing at least one of non-directional prediction, directional prediction, location information-based prediction or cross-color component prediction. Additionally, in a process of performing intra prediction, filtering may be performed with respect to a prediction sample. When the additional filtering is performed, filtering may be performed with respect to one or more prediction samples in the current block based on at least one of the intra prediction mode, a width and a height, the shape of the block or the location of the prediction sample. At this time, a filter type, for example, at least one of a filter coefficient, a filter tap or a filter shape may be different.

Hereinafter, step S801 of deriving the intra prediction mode will be described.

One or more reconstructed neighbor blocks may be used to derive the intra prediction mode of the current block. The location of the reconstructed neighbor block may be a predefined fixed location or a location derived by encoding/decoding. Hereinafter, encoding/decoding may mean entropy encoding/decoding. For example, when the coordinates of a sample of an upper left corner of the current block having a size of W×H are (0, 0), the neighbor block may be at least one of blocks adjacent to coordinates (−1, H−1), (W−1, −1), (W, −1). (−1, H) and (−1, −1) or neighbor blocks of the blocks. At this time, W and H may mean the width W and height H of the current block or the number of samples.

The intra prediction mode of an unavailable neighbor block may be replaced by a predetermined intra prediction mode. The predetermined intra prediction mode may be, for example, a DC mode, a Planar mode, a vertical mode, a horizontal mode and/or a diagonal mode. For example, when the neighbor block is located outside the boundary of at least one predetermined unit such as a picture, a slice, a tile or a coding tree unit (CTU), is subjected to inter prediction or is encoded in a PCM mode, the neighbor block may be determined as being unavailable. In contrast, when the neighbor block is an inter prediction block and an indicator (e.g., inter_intra_flag) indicating whether inter prediction and intra prediction are combined is 1, the neighbor block may be determined as being available.

For example, when the neighbor block is an upper block and a CTU, to which the neighbor block belongs, is different from a CTU, to which the current block belongs (that is, the upper boundary of the current block is the upper boundary of the current CTU), the neighbor block may be determined as being unavailable. In this case, instead of the intra prediction mode of the neighbor block, the Planar mode may be used. That is, the Planar mode may be derived as the intra prediction mode of the current block.

The intra prediction mode of the current block may be derived by a statistical value of the intra prediction mode of a neighbor block at a predetermined location or the intra prediction mode of two or more neighbor blocks. Here, the statistical value may mean at least one of an average value, a maximum value, a minimum value, a most frequent value, a median value, a weighted average value or an interpolated value. A mode corresponding to the maximum value of the intra prediction mode of an upper block and the intra prediction mode of a left block may be determined as an MPM candidate, thereby being derived as the intra prediction mode of the current block.

Alternatively, the intra prediction mode of the current block may be derived based on the sizes of the neighbor blocks. For example, the intra prediction mode of a neighbor block having a relatively large size may be derived as the intra prediction mode of the current block. Alternatively, the statistical value may be calculated by giving a relatively large weight to the intra prediction mode of a block having a relatively large size.

Alternatively, it may be considered whether the intra prediction mode of the neighbor block is directional. For example, when the intra prediction mode of the neighbor block is non-directional, the non-directional mode may be derived as the intra prediction mode of the current block. Alternatively, the intra prediction mode of the current block may be derived using the intra prediction mode of the neighbor block other than the non-directional mode.

In order to derive the intra prediction mode of the current block, one or more most probable mode (MPM) lists may be constructed using the intra prediction mode of the neighbor block. The number N of candidate modes included in the MPM list may be fixed or may be determined according to the size and/or shape of the current block. The MPM list may be constructed without duplicated mode. When the number of available candidate modes is less than N, a predetermined candidate mode of available candidate modes, e.g., one or more modes obtained by adding or subtracting a predetermined offset to or from the directional mode may be added to the MPM list. Alternatively, at least one of a horizontal mode, a vertical mode, a 45-degree mode, a 135-degree mode, a 225-degree mode, or a non-directional mode may be added to the MPM list. The predetermined offset may be 1, 2, 3, 4 or a positive integer.

For example, modes obtained by adding or subtracting a predetermined offset to or from the minimum values and the maximum values of the directional candidate to modes included in the MPM list may be added to the MPM list as MPM candidates. For example, a mode obtained by adding or subtracting in to or from the minimum value and a mode obtained by adding or subtracting n to or from the maximum value may be added to the MPM list. At this time, m and n may be positive integers (e.g., 1 or 2).

The same MPM candidate may not be repeatedly included in the MPM list. Accordingly, the MPM list construction method may be differently applied based on a difference between the minimum value and the maximum value, such that a mode obtained by adding m to the minimum value is not consistent with a mode obtained by subtracting n from the maximum value. For example, when the difference between the minimum value and the maximum value of the candidate modes included in the MPM list is determined as 1, the mode obtained by adding 1 to the minimum value is coincident with the maximum value and the mode obtained by subtracting 1 from the maximum value is coincident with the minimum value. Accordingly, the coincident modes may not be added to the MPM list. In this case, a mode obtained by subtracting 1 from the minimum value, a mode obtained by adding 1 to the maximum value and a third mode may be added to the MPM list. The third mode may be a mode obtained by subtracting 2 from the minimum value, for example.

The MPM list may be constructed in a predetermined order based on the location of the neighbor block. For example, the predetermined order may be the order of blocks adjacent to the left side, the upper side, the left lower corner, the right upper corner and the upper left corner of the current block. The non-directional mode may be included in an arbitrary location of the MPM list. For example, this may be added as the next order of the intra prediction mode of the blocks adjacent to the left side and the upper side.

For example, the MPM list may be constructed to always include the non-directional (e.g., DC and planar) mode. Since prediction is performed using all the upper and left reference samples, the probability of occurrence may be high. Accordingly, by always adding the DC mode and the Planar mode to the MPM list, it is possible to reduce bit overhead for intra prediction mode signaling.

In another example, the intra prediction mode of the current block may be derived using the intra prediction mode of the neighbor block and the intra prediction mode derived using the MPM list. For example, when the intra prediction mode derived using the MPM list is Pred_mpm, Pred_mpm may be changed using the intra prediction mode of the neighbor block. For example, when Pred_mpm is greater than the intra prediction mode of the neighbor block (or the statistical value of two or more intra prediction modes), Pred_mpm may increase by n, and, otherwise, decrease by n. At this time, n may be a predetermined integer such as +1, +2, +3, 0, −1, −2 or −3. The intra prediction mode of the current block may be derived as the changed Pred_mpm. Alternatively, when at least one of Pred_mpm or the intra prediction mode of the neighbor block is a non-directional mode, the intra prediction mode of the current block may be derived as anon-directional mode. In contrast, the intra prediction mode of the current block may be delved as a directional mode.

In another example, the intra prediction mode of the current block may be derived using the intra prediction mode of another color component. For example, when the current block is a chroma block, the intra prediction mode of a luma block corresponding to the chroma block may be used. The number of corresponding luma blocks may be one or more. The corresponding luma block may be determined based on at least one of the size, the shape and/or the encoding parameter of the chroma block. The corresponding luma block may be determined based on at least one of the size, the shape and/or the encoding parameter of the luma block.

The luma block corresponding to the chroma block may include a plurality of partitions. All or some of the plurality of partitions may have different intra prediction modes. The intra prediction mode of the chroma block may be derived based on all or some of the plurality of partitions in the corresponding luma block. At this time, some partitions may be selectively used based on comparison in block size, shape or depth information between the chroma block and the luma block (all or some of the plurality of partitions). The partition at a location in a luma block corresponding to a predetermined location in a chroma block may be selectively used. The predetermined location may mean the corner sample (e.g., upper left sample) location or a center sample location of the chroma block.

The method of deriving the cross-color component intra prediction mode of the present disclosure is not limited to use of the intra prediction mode of the corresponding luma block. For example, the intra prediction mode of the chroma block may be derived by using or sharing at least one of the mpm_idx or the MPM list of the corresponding luma block.

Figure 9:
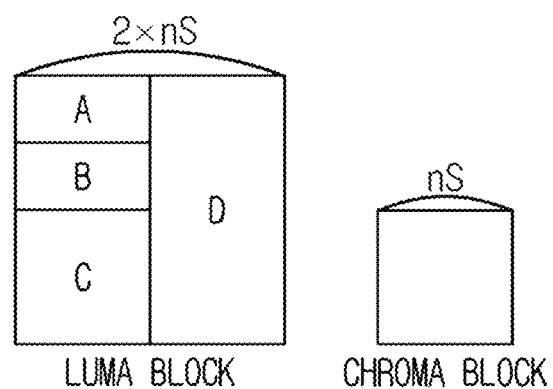
FIG. 9 is a view illustrating a relationship between a luma block and a chroma block according to an embodiment of the present invention.

FIG. 9 is a view illustrating a relationship between a luma block and a chroma block according to an embodiment of the present invention.

Referring to FIG. 9, a ratio among color components may be 4:2:0 and a luma block corresponding to a chroma block may be at least one of A, B, C or D.

Referring to FIG. 9, for example, the intra prediction mode of the chroma block may be derived using the intra prediction mode of a luma block A corresponding to an upper left location (0, 0) in the chroma block or the intra prediction mode of the luma block D corresponding to the center sample location (nS/2, nS/2) of the chroma block. The predetermined location in the chroma block is not limited to (0, 0) and (nS/2, nS/2). For example, the predetermined location may be the locations of the samples of upper, left lower and/or lower right corners in the chroma block.

The predetermined location may be selected based on the shape of the chroma block. For example, when the chroma block has a square shape, the predetermined location may be a center sample location. For example, when the chroma block is a rectangular shape, the predetermined location may be an upper left sample location. In the above example, the predetermined location when the chroma block has a square shape and the predetermined location when the chroma block has a rectangular shape may be opposite to each other.

In another example, the intra prediction mode of the chroma block may be derived using the statistical value of one or more intra prediction modes in the luma block corresponding in size to the size of the chroma block.

In another example, at least one of locations in the chroma block or at least one of locations in the luma block may be calculated based on the upper left location of each block. For example, the center sample location in the luma block may be calculated by adding (nS/2, nS/2) to the upper left location (0, 0) of the luma block.

Here, the horizontal location nS and the vertical location nS of the block may be different. For example, in case of a rectangular shape, the center sample location of the block may be different in the horizontal location and the vertical location.

Referring to FIG. 9, a mode corresponding to the average of the intra prediction modes of luma blocks A and D or a mode corresponding to the average of the intra prediction modes of A, B, C and D in the luma block corresponding to the size of the chroma block may be derived as the intra prediction mode of the chroma block.

When there is a plurality of available intra prediction modes of the luma blocks, all or some of the intra prediction modes may be selected. Selection may be performed based on the predetermined location in the chroma block or based on the size, shape and/or depth of the chroma block and/or the luma block. The intra prediction mode of the chroma block may be derived using the selected intra prediction mode of the luma block.

The intra prediction mode of the chroma block may be derived using the intra prediction mode of the luma block D having a relatively large size, by comparing the size of the luma block A corresponding to the upper left sample location (0, 0) in the chroma block with the size of the luma block D corresponding to the center sample location (nS/2, nS/2) in the chroma block.

In another example, when the luma block corresponding to the predetermined location in the chroma block is greater than or equal to the chroma block, the intra prediction mode of the chroma block may be derived using the intra prediction mode of the luma block.

In another example, when the size of the chroma block is in a predetermined range, the intra prediction mode of the chroma block may be derived using the intra prediction mode of the luma block corresponding to the upper left sample location (0, 0) in the chroma block.

In another example, when the size of the chroma block is in a predetermined range, the intra prediction mode of the chroma block may be derived using the intra prediction mode of a block having a large size, by comparing the sizes of the luma blocks corresponding to the predetermined locations (0, 0) and (nS/2, nS/2) in the chroma block.

The predetermined range may be derived based on at least one of information signaled via a bitstream, information on a size (and/or depth) of a block (chroma block and/or luma block) or information predefined in an encoder/decoder.

In another example, when the chroma block has a rectangular shape, the intra prediction mode of the chroma block may be derived using the intra prediction mode of the luma block corresponding to the center sample location (nS/2, nS/2) in the chroma block.

In another example, the intra prediction mode of the chroma block may be derived using partitions having the same shape as the chroma block among a plurality of partitions in the luma block. For example, when the chroma block has a square or non-square shape, the square or non-square partitions of the plurality of partitions in the luma block may be used.

Meanwhile, in the embodiment described above with reference to FIG. 9, deriving the intra prediction mode of the chroma block using the intra prediction mode of the luma block includes the case where the intra prediction mode of the luma block is used as the intra prediction mode of the chroma block without change. In addition, in addition to the use of the intra prediction mode of the luma block, information used when the intra prediction mode of the luma block is derived, including the mpm_idx and MPM list of the luma block, may be used.

In another example, the MPM list of the chroma block may be constructed using the intra prediction mode of the luma block corresponding to the predetermined location. In this case, the mpm_idx information of the chroma block may be encoded and signaled. The MPM list of the chroma block may be constructed using a similar method as the MPM list of the luma block. However, the MPM candidates of the chroma block may include the intra prediction mode of a neighbor chroma block and/or the intra prediction mode of a corresponding luma block.

When an MPM flag is 0, a secondary MPM list including one or more intra prediction modes may be constructed, and the intra prediction mode of the current block may be derived using a secondary MPM index 2nd_mpm_idx. At this time, a secondary indicator (e.g., secondary MPM flag) indicating whether the intra prediction mode of the current block is included in the secondary MPM list may be encoded/decoded. The secondary MPM list may be constructed using the intra prediction mode of the neighbor block similarly to the primary MPM list. At this time, the intra prediction mode included in the primary MPM list may not be included in the secondary MPM list. The number of MPM lists is not limited to one or two and N MPM lists may be used.

When the intra prediction mode of the current block is not included in one of a plurality of MPM lists, the intra prediction mode of the luma component of the current block may be encoded/decoded. In addition, the intra prediction mode of the chroma component may be derived or encoded/decoded based on the intra prediction mode of the corresponding luma component.

When the current block is partitioned into a plurality of subblocks, at least one of the above-described methods is applicable in order to derive the intra prediction mode of each of the partitioned subblocks.

The size and/or shape of the subblock may be a predetermined size and/or shape (e.g., 4×4) or may be determined according to the size and/or shape of the current block. Alternatively, the size of the subblock may be determined depending on whether the neighbor block of the current block is partitioned or based on the intra prediction mode of the neighbor block of the current block. For example, the current block may be partitioned based on a boundary in which intra prediction modes of the neighbor blocks are different. Alternatively, the current block may be partitioned depending on whether the neighbor block is an intra encoded block or an inter encoded block.

An indicator (e.g., NDIP_flag) indicating that the intra prediction mode of the current block is derived using the intra prediction mode of the neighbor block may be encoded/decoded. The indicator may be encoded/decoded every at least one unit of the current block or the subblock. At this time, only when the size of the current block or the subblock corresponds to a predetermined size or a predetermined size range, the indicator may be encoded/decoded.

Determination as to whether the size of the current block corresponds to the predetermined size may be performed based on the width or height of the current block. For example, when the width or height is partitionable, it may be determined that the size of the current block corresponds to the predetermined size.

When the current block is partitioned into a plurality of subblocks, the intra prediction modes of the plurality of subblocks may be derived in a zigzag order or in parallel. The intra prediction mode of the subblock may be derived using at least one of the methods of deriving the intra prediction mode of the current block. At this time, the neighbor block of the current block may be used as the neighbor block of each subblock. Alternatively, the subblock in the current block may be used as the neighbor block of each subblock.

The intra prediction mode of the subblock belonging to the current block may be derived using the average value of the intra prediction mode of the current block and the intra prediction modes of the blocks adjacent to the left and upper sides of the (0, 0) location sample of each subblock. For example, when the intra prediction mode of the current block is greater than the average value, ½ of the average may be subtracted from the derived intra prediction mode and, when the intra prediction mode of the current block is equal to or less than the average value, ½ of the average may be added to the derived intra prediction mode.

Information on intra prediction may be signaled through at least one of a video parameter set (VPS), a sequence parameter set (SPS), a picture parameter set (PPS), an adaptation parameter set (APS), a slice header or a tile header. In a predetermined block size or less, at least one of information on intra prediction may not be signaled. In this case, information on intra prediction of a previously encoded/decoded block (e.g., an higher block) may be used.

Figure 10:
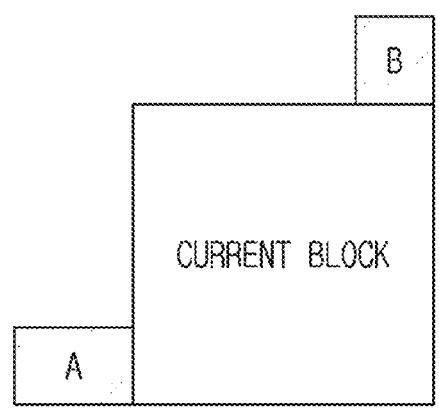
FIG. 10 is a view illustrating neighbor blocks capable of being referenced to derive an intra prediction mode of a current block according to an embodiment of the present invention.

FIG. 10 is a view illustrating neighbor blocks capable of being referenced to derive an intra prediction mode of a current block according to an embodiment of the present invention.

Figure 11:
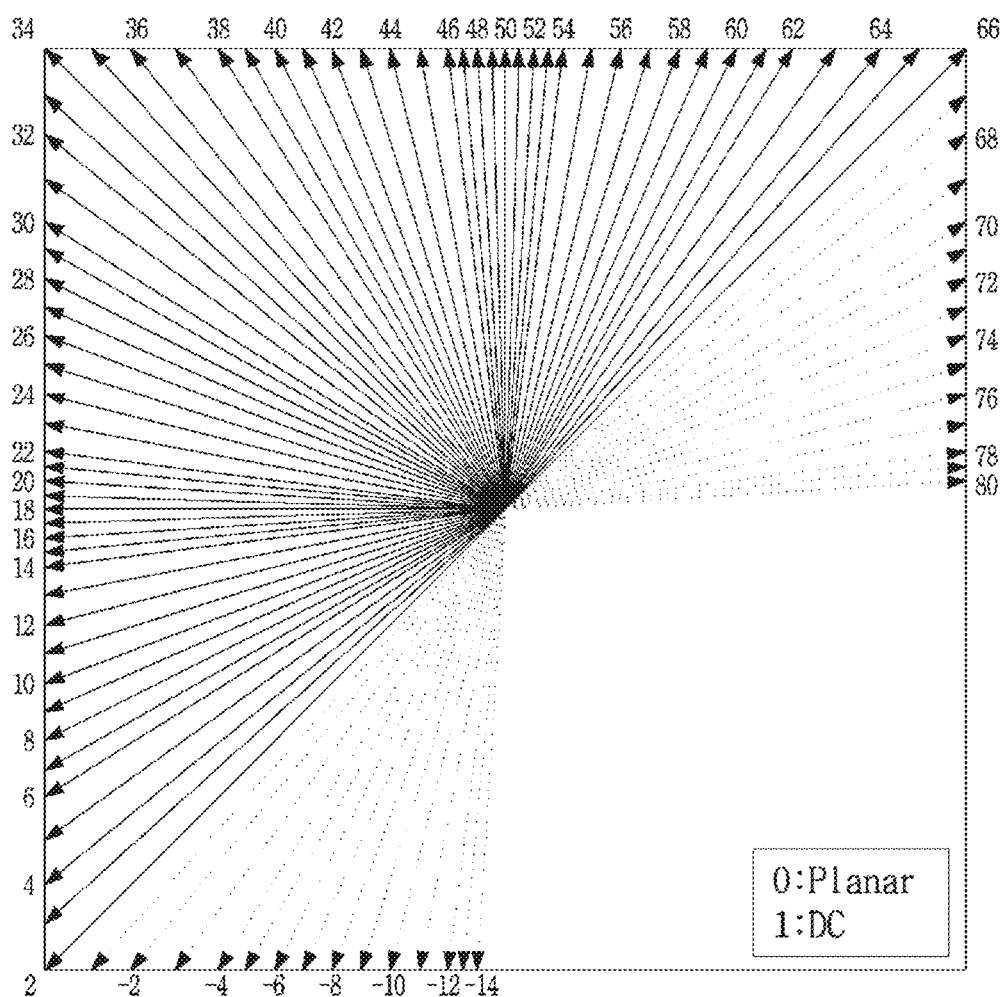
FIG. 11 is a view illustrating an intra prediction mode according to an embodiment of the present invention.

For example, as in the example of FIG. 10, the intra prediction mode of the current block may be derived using the intra prediction modes of the right upper and left lower neighbor blocks of the current block. The intra prediction mode of the right upper neighbor block may be B, the intra prediction mode of the left lower neighbor block may be A, and A and B may mean intra prediction mode numbers, for example, at least one of the intra prediction mode numbers of FIG. 11. In addition, the MPM candidates of the current block may be derived using the statistical value of A and B (e.g., at least one of a maximum value/minimum value, a median value or an average value). In addition, the MPM candidates may be derived by applying a predetermined offset (e.g., +/−1, 2, 3 . . . ) to A, B or the statistical value, and, for example, a mode, to which an offset is applied, may be derived through a modular (%) operation. In addition, the predetermined offset may be added or subtracted.

In another example, the method of deriving the intra prediction mode of the current block may vary based on at least one of multi reference sample line related information (e.g., intra_luma_ref_idx), subblock partition prediction information (e.g., intra_sub_partition_flag, or intra_sub_partition_type) or intra/inter combination prediction related information (e.g., mh_intra_flag).

In another example, an MPM list may be constructed and an intra prediction mode may be derived using the same method, regardless of the multi reference sample line related information, the subblock partition prediction information, the intra/inter combination prediction related information, etc.

The multi reference sample line related information may mean whether reference sample lines secondly or higher adjacent to the current block are used and/or line index information. At this time, the indices of the firstly, secondly, thirdly and fourthly adjacent reference sample lines may be 0, 1, 2 and 3.

For example, the intra prediction mode of the current block may be derived based on the first, second and/or third reference sample lines adjacent to the current block. Alternatively, determination as to whether the reference sample is available, determination as to whether to replace the reference sample, filtering of the reference sample may be performed based on the first, second and/or third reference sample lines adjacent to the current block.

Meanwhile, the first, second and/or third reference sample lines adjacent to the current block may be used to derive the parameter of a cross-component linear mode (CCLM). For example, the reference sample line available for the intra prediction of the current block and the reference sample line available for deriving the parameter of the CCLM may be the same. Here, the reference sample line may mean the first, second and/or third reference sample lines adjacent to the current block.

Here, the indices indicating the first, second and third reference sample lines adjacent to the current block may be respectively 0, 1 and 2.

In addition, when a reference sample line 1 available for the intra prediction of the current block and a reference sample line 2 available for deriving the parameter of the CCLM are different, for example, when the reference sample line 1 includes the first, second and fourth reference sample lines adjacent to the current block and the reference sample line 2 includes the first, second and third reference sample lines adjacent to the current block, the encoder/decoder may require an additional memory for the fourth reference sample line.

Accordingly, when the reference sample line 1 becomes equal to the reference sample line 2 by using the third reference sample line instead of the fourth reference sample line, the additional memory may not be required. In addition, a predetermined mapping table indicating the mapping relationship between the reference sample lines and the indices of the reference sample lines, which is preset in the encoder/decoder, may not be provided.

The subblock partition prediction information may mean at least one of whether the current block is partitioned into predetermined subblocks to perform prediction, a partitioning direction or the number of partitions.

Here, the above method may be one of the below-described embodiments.

In the following embodiments. A may mean the intra prediction mode of the left lower neighbor block as in the example of FIG. 10, and B may mean the intra prediction mode of the right upper neighbor block as in the example of FIG. 10.

In addition, the MPM list constructed in the following embodiment may be constructed, except for the Planar mode. For example, the MPM list may be constructed after determining whether the intra prediction mode of the current block is the Planar mode. Alternatively, the MPM list of the current block may be constructed based on information on whether the intra prediction mode of the current block is the Planar mode.

FIGS. 12 to 17 are views illustrating a process of constructing an MPM list according to an embodiment of the present invention.

Figure 12:
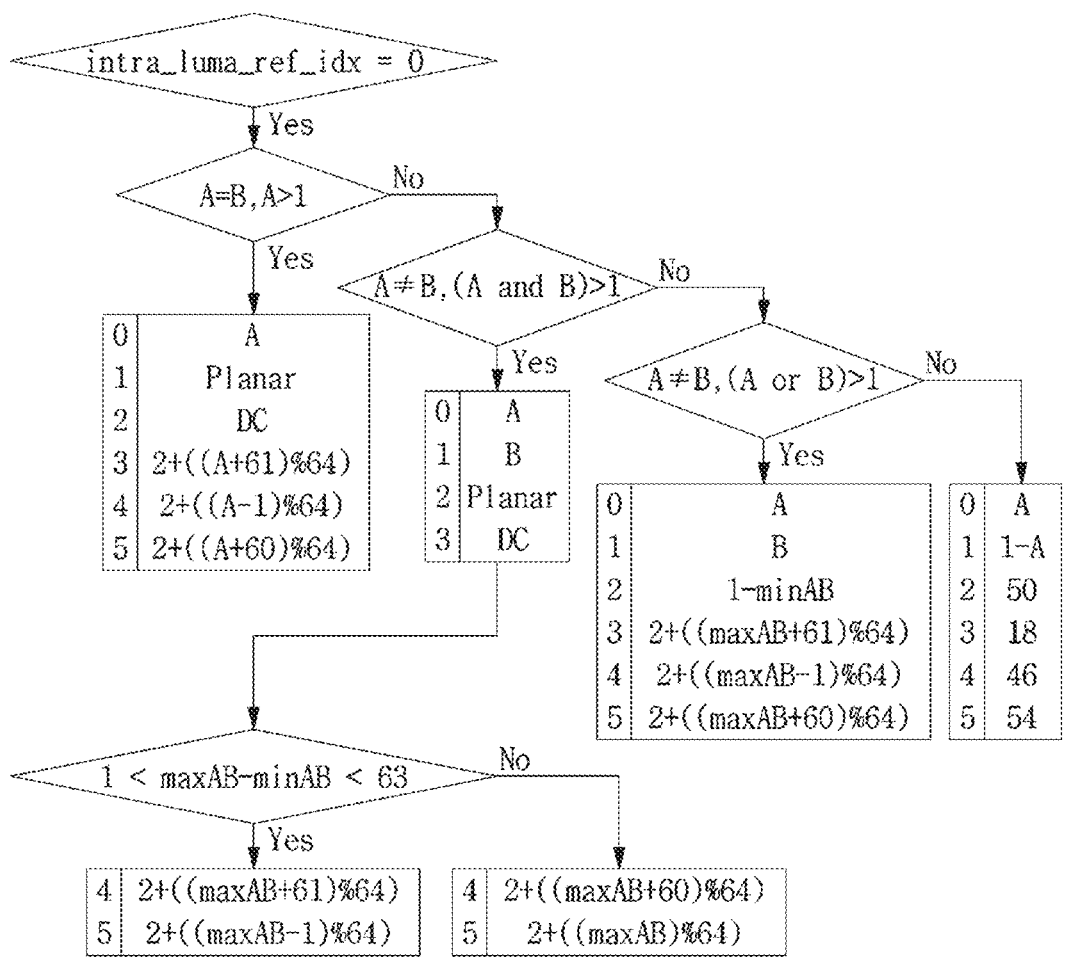
FIGS. 12 to 18 are views illustrating a process of constructing an MPM list according to an embodiment of the present invention.

For example, when intra prediction is performed using the first reference sample line adjacent to the current block (e.g., intra_luma_ref_idx=0) or when subblock partition prediction is performed (e.g., intra_sub_partition_flag=1), the MPM candidate may be derived and the intra prediction mode of the current block may be derived as in the example of FIG. 12.

1) In a case where A and B are the same mode and are directional modes (e.g., modes greater than 1), 5 or 6 MPM candidates may be constructed in the MPM list in the following order: [A. Planar, DC, 2+((A+61)%64), 2+((A−1)%64), 2+((A+60)%64)], or [Planar, A, 2+((A+61)%64), 2+((A−1)%64), 2+((A+60)%64), 2+(A %64)].

2) In a case where A and B are different and are directional modes, 4 MPM candidates may be constructed in the MPM list in the following order: [A, B, Planar, DC].

Additionally, a mode having the larger size between A and B may be determined as maxAB and a mode having the smaller size may be determined as minAB. At this time, when a difference between a maxAB and minAB is greater than 1 and is less than 63, two MPM candidates [2+((maxAB+61)%64), 2+((maxAB−1)%64] may be added to the MPM list, thereby filling the list with six candidates.

Meanwhile, when the difference between maxAB and minAB is 1 or is greater than or equal to 63, two MPM candidates [2+((maxAB+(60)%64), 2+((maxAB) %64] may be added to the MPM list, thereby filling the list with six candidates.

3) In a case where A and B are different, one of A and B is a directional mode and the other is a non-directional mode, 5 or 6 MPM candidates may be constructed in the MPM list in the following order [A. B, 1−minAB, 2+((maxAB+61)%64), 2+((maxAB−1)%64, 2+((maxAB+60)%64], or [maxAB, 2+((maxAB+61)%64), 2+((maxAB−1)%64, 2+((maxAB+60)%64, 2+(maxAB %64)].

4) In a case other than the above cases, for example, in a case where A and B are the same and are a non-directional mode (e.g., a mode less than or equal to 1), 5 or 6 MPM candidates may be constructed in the MPM list in the following order [A, 1-A, 50, 18, 46, 54] or [DC, 50, 18, 46, 54].

The MPM candidates may be secondarily derived by applying a predetermined offset to the constructed 5 or 6 MPM candidates.

Under a predetermined condition, only some of the steps of FIG. 12 may be performed. For example, the MPM candidate mode may be constructed except for the Planar mode.

Figure 13:
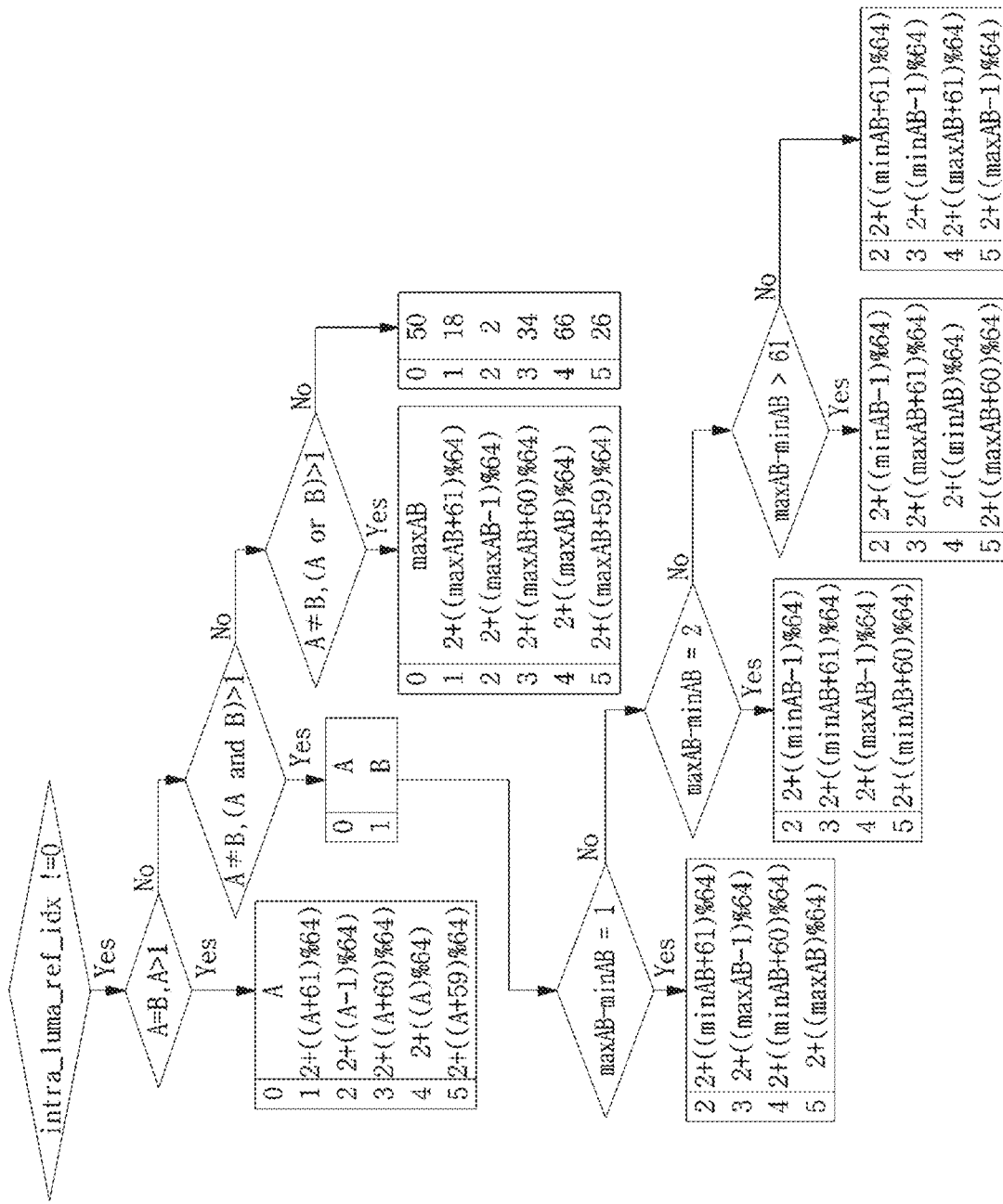

In another example, when intra prediction is performed using one of the second reference sample line and higher adjacent to the current block (e.g., intra_luma_ref_idx !=0 or intra_luma_ref_idx>0) or when subblock partition prediction is performed (e.g., intra_sub_partition_flag=1), the MPM candidate may be derived and the intra prediction mode of the current block may be derived as in the example of FIG. 13.

Meanwhile, as described above, the MPM list may be constructed and the intra prediction mode may be derived using the same method, regardless of the multi reference sample line related information, the subblock partition prediction information, etc.

In a case where A and B are the same mode and are directional modes (e.g., modes greater than 1), 5 or 6 MPM candidates may be constructed in the MPM list in the following order. [A, 2+((A+61)%64), 2+((A−1)%64), 2+((A+60)%64), 2+((A) %64), 2+((A+59)%64)], or [A, 2+((A+61)%64), 2+((A−1)%64), 2+((A+60)%64), 2+(A %64)].

2) In a case where A and B are different and are directional modes, 2 MPM candidates may be constructed in the MPM list in the following order: [A, B].

In this case, the MPM list may be constructed based on a predetermined mode. Here, the predetermined mode may be 1, 2, or 61 (or 62). That is, the MPM list may be differently constructed based on the intra prediction mode 1, 2, or 61 (or 62). Here, differently constructing the MPM list may mean that candidates included in the MPM list may be different or the order of candidates may be different.

Additionally, a mode having the larger size between A and B may be determined as maxAB, a mode having the smaller size may be determined as minAB, and four modes may be derived by comparing the sizes of A and B.

2-1) In a case where a difference between maxAB and minAB is 1, the following 3 or 4 candidates may be added to the MPM list: [2+((minAB+61)%64), 2+((maxAB−1)%64), 2+((minAB+60)%64), 2+((maxAB) %64)], or [2+((minAB+61)%64), 2+((maxAB−1)%64), 2+((minAB+60)%64)].

2-2) In a case where a difference between maxAB and minAB is 2, the following 3 or 4 candidates may be added to the MPM list: [2+((minAB−1)%64), 2+((maxAB+61)%64), 2+((maxAB−1)%64), 2+((minAB+60)%64)], or [2+((minAB−1)%64), 2%((minAB+61)%64), 2+(maxAB−1)%64)].

2-3) In a case where a difference between maxAB and minAB is greater than 61 (that is, greater than or equal to 62), the following 3 or 4 candidates may be added to the MPM list: [2+((minAB−1)%64), 2+((maxAB+61)%64), 2+((minAB) %64), 2+((nmxAB+60)%64)], or [2+((minAB−1)%64), 2+((maxAB+61)%64), 2+((minAB) %64)].

2-4) In a case where a difference between maxAB and minAB does not correspond to 2-1 to 2-3 (that is, the difference between maxAB and minAB is greater than 2 and is less than 62), the following 4 candidates may be added to the MPM list: [2+((minAB+61)%64), 2+((minAB−1)%64), 2+((maxAB+61)%64), 2+((maxAB−1)%64)], or [2+((minAB+61)%64), 2+((minAB−1)%64), 2+((maxAB+61)%64)].

3) In a case where A and B are different, one of A and B is a directional mode and the other is a non-directional mode, 5 or 6 MPM candidates may be constructed in the MPM list in the following order [maxAB, 2+((maxAB+61)%64), 2+((maxAB−1)%64), 2+((maxAB+60)%64), 2+((maxAB) %64), 2+((maxAB+59)%64)], or [maxAB, 2+((maxAB+61)%64), 2+((maxAB−1)%64), 2+((maxAB+60)%64), 2+((maxAB) %64)].

4) In a case other than the above cases, for example, in a case where A and B are the same and are non-directional modes (e.g., modes less than or equal to 1), 5 or 6 MPM candidates may be constructed in the MPM list in the following order: [50, 18, 2, 34, 66, 26], or [DC, 50, 18, 46, 54].

In case of intra_luma_ref_idx !=0 as described above, the non-directional mode (e.g., DC or planar) may not be derived as the MPM candidate.

The order may be changed. For example, the mode of 6 MPM candidates may be derived using a mode having a changed order as follows: [34, 50, 18, 2, 66, 26].

A mode constructing the above-described mode may be a predetermined directional mode, for example, a predetermined directional mode other than 50, 18, 2, 34, 66, 26.

MPM candidates may be secondarily derived by applying a predetermined offset to the constructed 6 MPM candidates.

Under a predetermined condition, only some of the steps of FIG. 13 may be performed.

For example, when the intra prediction mode of the current block is not the Planar mode, the MPM candidate mode may be constructed except for the Planar mode.

In another example, a candidate located at a predetermined location may be excluded from the constructed MPM list. Alternatively, the MPM list may be reconstructed using some candidates of the constructed MPM list.

In another example, when the intra prediction mode of the current block is not the Planar mode, the MPM candidates except for the MPM candidate located at the last location in the MPM list may be constructed. In this case, in the example of 2-1), the MPM list may be composed of the candidates of [2+((minAB+61)%64), 2+((maxAB−1)%64), 2+((minAB+60)%64)]. In addition, in the example of 2-2), the MPM list may be composed of the candidates [2+((minAB−1)%64), 2+((minAB+61)%64), 2+((maxAB−1)%64)]. In addition, in the example of 2-3), the MPM list may be composed of the candidates of [2+((minAB−1)%64), 2+((maxAB+61)%64), 2+((minAB) %64)]. In addition, in the example of 2-4), the MPM list may be composed of the candidates of [2+((minAB+61)%64), 2+((minAB−1)%64), 2+((maxAB+61)%64)].

Figure 14:
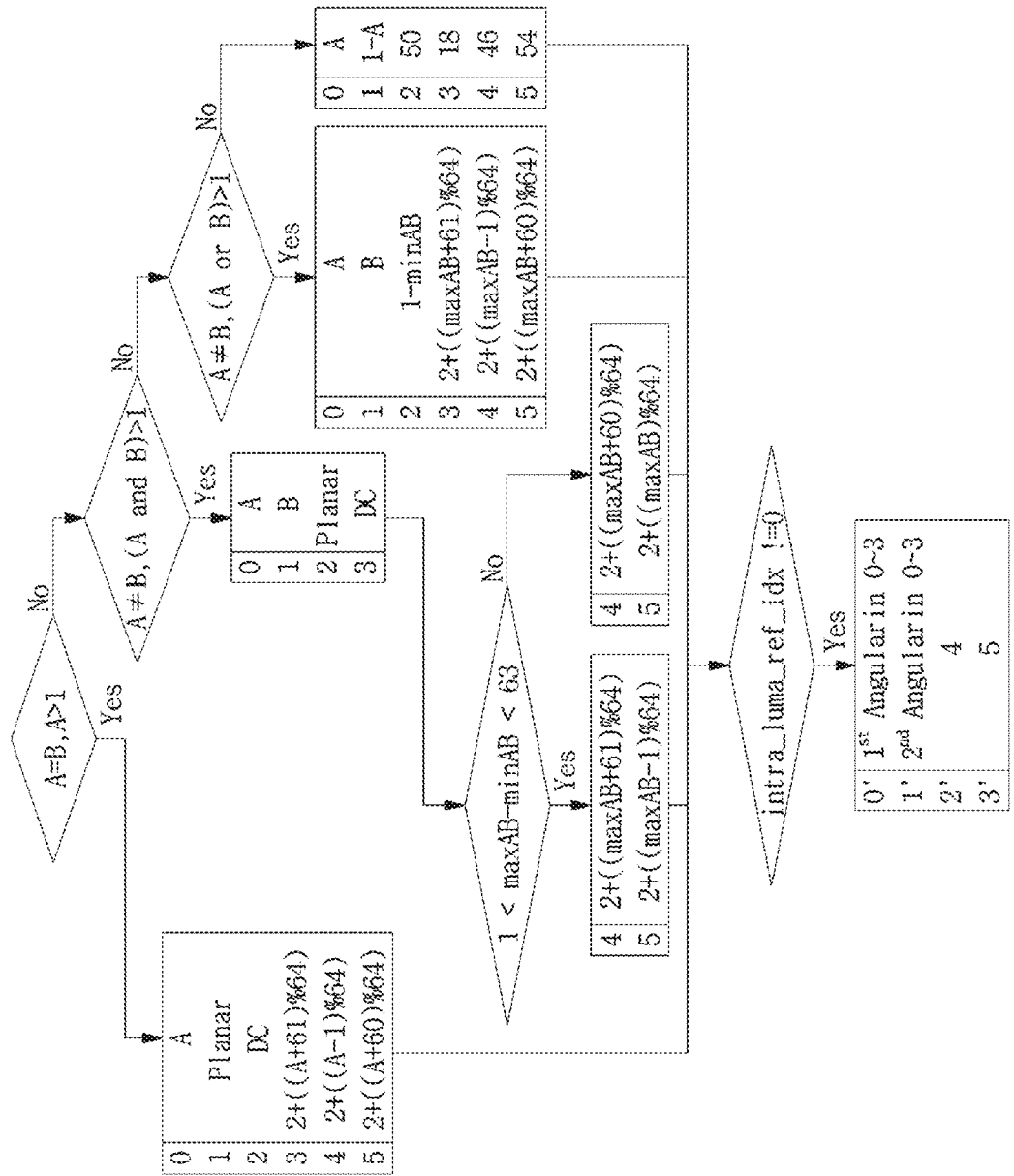

In another example, when intra prediction is performed using one of the second reference sample line or higher adjacent to the current block (e.g., intra_luma_ref_idx !=0 or intra_luma_ref_idx>0), the MPM candidate may be derived and the intra prediction mode of the current block may be derived as in the example of FIG. 14.

Meanwhile, as described above, the MPM list may be constructed and the intra prediction mode nay be derived using the same method, regardless of the multi reference sample line related information, the subblock partition prediction information, etc.

At this time, the method of deriving 6 MPM candidates may be performed using the same method regardless of intra_luma_ref_idx. That is, in the same manner as the method of deriving the MPM candidates when intra_luma_ref_idx=0, 6 MPM candidates may be derived and then the MPM candidates may be reconstructed when intra_luma_ref_idx !=0. For example, 4 MPM candidate modes except for the non-directional mode among the derived 6 candidates may be derived. Alternatively, in the derivation process using the same method, one or more non-directional modes may be excluded. For example, in the same manner as the method of deriving the MPM candidates when intra_luma_ref_idx=0, the MPM candidates may be constructed in five modes except for the Planar mode in the MPM list derivation process.

The MPM derivation method when intra_luma_ref_idx=0 may include the DC mode and the Planar mode, which are the non-directional modes, among list candidates 0 to 3. Accordingly, two directional modes except for the non-directional modes among the four candidates may be reconstructed in the MPM list. In addition, four MPM candidate modes may be derived by adding two directional modes corresponding to list candidates 4 and 5 among the six candidates.

The reconstructed MPM list may have four candidate modes, and the MPM list when intra_luma_ref_idx !=0 may be derived using the MPM list derived when intra_luma_ref_idx=0.

A syntax (e.g., mrl_intra_luma_mpm_idx) for signaling the reconstructed four MPM indices may be added. Alternatively, the indices may be signaled using intra_luma_mpm_idx signaled previously.

When the MPM is derived using the above-described method, the methods of deriving six MPMs may be unified. In addition, it is possible to simplify the additional derivation process when intra_luma_ref_idx !=0.

The MPM candidates may be secondarily derived by applying a predetermined offset to the constructed 6 MPM candidates.

Under a predetermined condition, only some of the steps of FIG. 14 may be performed. For example, when the intra prediction mode of the current block is not the Planar mode, the MPM candidate mode may be constructed except for the Planar mode. In another example, when the intra prediction mode of the current block is not the Planar mode, the MPM candidates excluding the MPM candidate located at the last location in the MPM list may be constructed.

Figure 15:
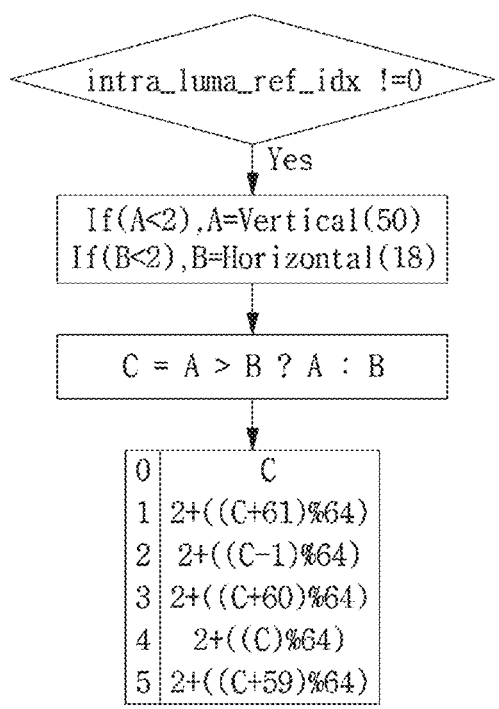

In another example, when intra prediction is performed using one of the second reference sample line and higher adjacent to the current block (e.g., intra_luma_ref_idx !=0 or intra_luma_ref_idx>0), the MPM candidate may be derived and the intra prediction mode of the current block may be derived as in the example of FIG. 15. Meanwhile, as described above, the MPM list may be constructed and the intra prediction mode may be derived using the same method, regardless of the multi reference sample line related information, the subblock partition prediction information, etc.

1) In a case where the intra prediction mode of A or B derived from the neighbor block is a non-directional mode, this may be changed to a predetermined directional mode. For example, this may be changed to a directional mode varying according to the location of the neighbor block. For example, when the intra prediction mode of A is a non-directional mode, the A mode may be changed to 18 which is a horizontal mode. In addition, when the intra prediction mode of B is a non-directional mode, the B mode may be changed to 50 which is a vertical mode.

2) One mode (e.g., C) may be derived by comparing A with B. For example, when A and B are the same, one mode may be derived. Alternatively, one candidate may be derived using the statistical value of A and B (e.g., at least one of a maximum value/minimum value, a median value or an average value). A mode having the same value or a maximum value between A and B may be derived as shown in the following equation: C=A> B ? A: B.

3) Six MPM candidate modes may be derived based on the derived mode C as follows: [C, 2+((C+61)%64), 2+((C−1)%64), 2+((C+60)%64), 2+((C) %64), 2+((C+59)%64)]

When the MPM candidate is derived as in the example of FIG. 15, it is possible to reduce complexity of deriving the MPM list when intra_luma_ref_idx !=0.

MPM candidates may be secondarily derived by applying a predetermined offset to the constructed 6 MPM candidates.

Under a predetermined condition, only some of the steps of FIG. 15 may be performed.

Figure 16:
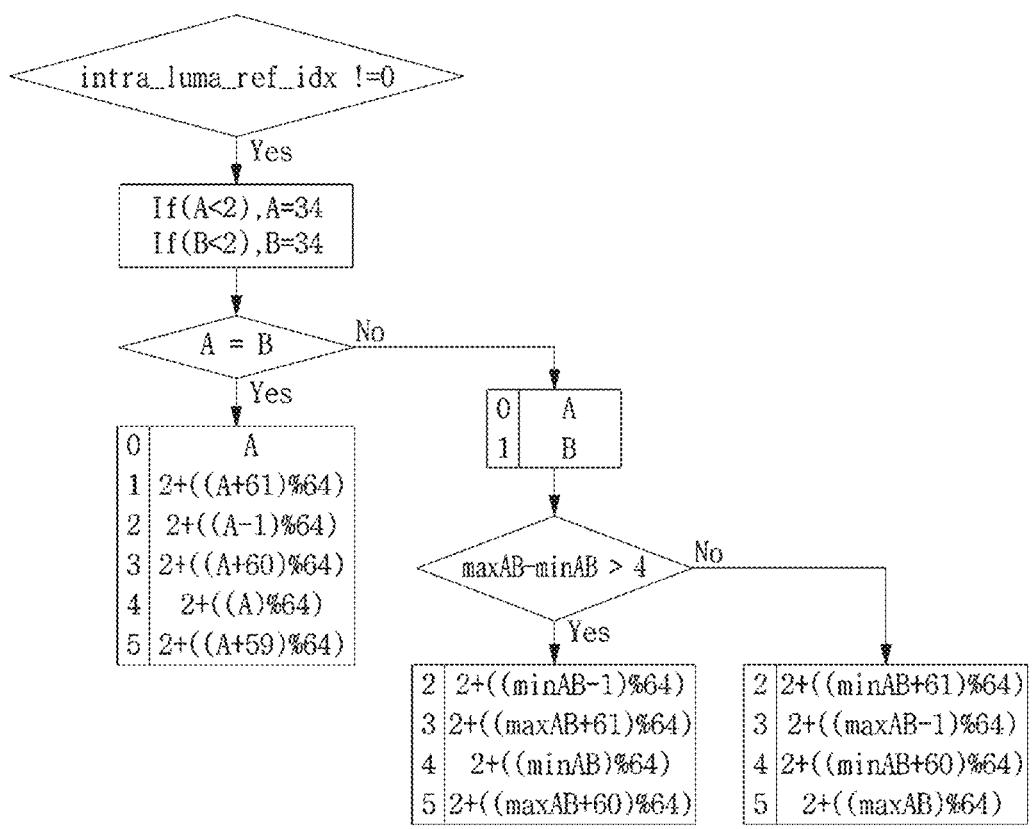

In another example, when intra prediction is performed using one of the second reference sample line or higher adjacent to the current block (e.g., intra_luma_ref_idx !=0 or intra_luma_ref_idx>0), the MPM candidate may be derived and the intra prediction mode of the current block may be derived as in the example of FIG. 16.

Meanwhile, as described above, the MPM list may be constructed and the intra prediction mode may be derived using the same method, regardless of the multi reference sample line related information, the subblock partition prediction information, etc.

1) In a case where the intra prediction mode of A or B derived from the neighbor block is a non-directional mode, this may be changed to a predetermined directional mode. For example, both A and B may be changed to a diagonal mode (e.g., mode 34) using both upper and left reference samples.

When the intra prediction modes of A and B are the same, six MPM candidate modes may be derived using A and the adjacent intra prediction mode. [A, 2+((A+61)%64), 2+((A−1)%64), 2+((A+60)%64), 2+((A) %64), 2+((A+59)%64)]

3) When the intra prediction modes of A and B are different. A and B may be added to the MPM list and four MPM candidate modes may be added based on the statistical value of A and B (e.g., at least one of a difference value, a maximum value/minimum value, a media value or an average value). At this time, the candidate mode may be derived based on a distance between A and B such that the four candidate modes do not overlap each other.

4) When a value obtained by subtracting a minimum value from a maximum value between A and B is greater than 4, a mode adjacent to a minimum value mode and greater than the minimum value mode (e.g., minimum value+1 or minimum value+2) may be derived as the MPM candidate mode. In addition, a mode adjacent to a maximum value mode and less than the maximum value mode (e.g., maximum value −1 or maximum value −2) may be derived as the MPM candidate mode. The order of four candidate modes added to the MPM list is as follows: [2+((minAB−1)%64), 2+((maxAB+61)%64), 2+((minAB) %64), 2+((maxAB+60)% 64)]

5) When a value obtained by subtracting a minimum value from a maximum value between A and B is less than or equal to 4 (that is, the A and B mode are adjacent), a mode adjacent to the minimum value mode and less than the minimum value mode (e.g., minimum value−1 or minimum value−2) may be derived as the MPM candidate mode. In addition, a mode adjacent to the maximum value mode and greater than the maximum value mode (e.g., maximum value+1 or maximum value+2) may be derived as the MPM candidate mode. The order of four candidate modes added to the MPM list is as follows: [2+((minAB+61)%64), 2+((maxAB−1)%64), 2+((minAB+60)%64), 2+((maxAB)%64)]

The derivation method according to the case where the difference between the maximum value and the minimum value is greater than 4 or the case where the difference between the maximum value and the minimum value is less than or equal to 4 is applicable to the example of FIG. 13. For example, instead of the derivation method in the case where the difference between the maximum value and the minimum value is 2 or 6 or is greater than 61 in the example of FIG. 13, the derivation method in the case where the difference between the maximum value and the minimum value is greater than 4 or the difference between the maximum value and the minimum value is less than or equal to 4 in the example of FIG. 16 may be used.

MPM candidates may be secondarily derived by applying a predetermined offset to the constructed 6 MPM candidates.

Under a predetermined condition, only some of the steps of FIG. 16 may be performed.

Figure 17:
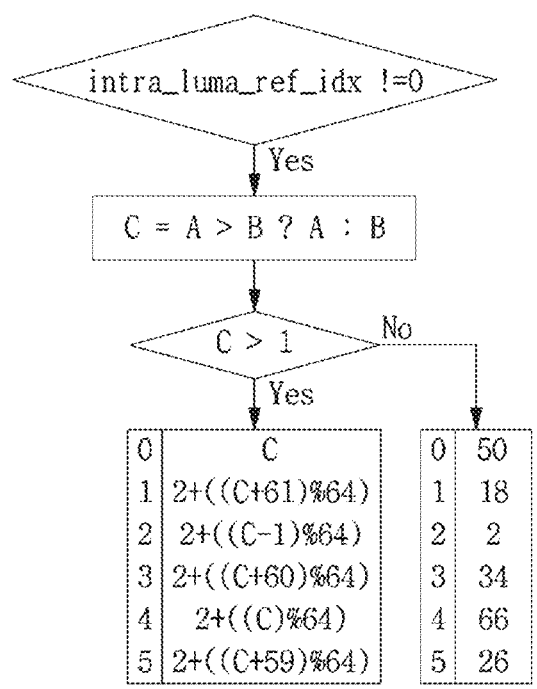

In another example, when intra prediction is performed using one of the second reference sample line or higher adjacent to the current block (e.g., intra_luma_ref_idx !=0 or intra_luma_ref_idx>0), the MPM candidate may be derived and the intra prediction mode of the current block may be derived as in the example of FIG. 17.

Meanwhile, as described above, the MPM list may be constructed and the intra prediction mode may be derived using the same method, regardless of the multi reference sample line related information, the subblock partition prediction information, etc.

1) One mode (e.g., C) may be derived by comparing A with B from the neighbor block. For example, when A and B are the same, one mode may be derived. Alternatively, one candidate may be derived using the statistical value of A and B (e.g., at least one of a maximum value/minimum value, a median value or an average value). A mode having the same value or a maximum value between A and B may be derived as shown in the following equation: C=A>B ? A: B.

Alternatively, a mode having the same value or a minimum value between A and B may be derived as shown in the following equation: C=A>B ? B: A 2) When the derived mode C is a directional mode (e.g., C>1), six MPM candidate modes may be derived using the neighbor mode adjacent to the mode C as follows: [C, 2+((C+61)%64), 2+((C−1)%64), 2+((C+60)%64), 2+((C) %64), 2+((C+59)%64)]

3) When the derived mode C is a non-directional mode (e.g., C<=1), six MPM candidate modes may be derived as follows: [50, 18, 2, 34, 66, 26]

The order of pre-defined modes may be changed. For example, six MPM candidate modes may be derived using the pre-defined modes with the changed order as follows: [34, 50, 18, 2, 66, 26]

Alternatively, six MPM candidate modes may be assigned to the MPM list (e.g., candModeList) in the following order [50, 18, 34, 66, 2, 26]

The mode constructing the pre-defined modes may be a predetermined directional mode, for example, a predetermined directional mode other than 50, 18, 2, 34, 66, 26.

MPM candidates may be secondarily derived by applying a predetermined offset to the constructed 6 MPM candidates.

Under a predetermined condition, only some of the steps of FIG. 17 may be performed.

The mode C may be derived by being fixed to one of A and B. For example, the MPM candidate mode may be derived using the same method as described above, by fixing the mode C to A which is the mode of the left neighbor block and determining whether the mode of A is a directional mode.

Figures 18, 19:
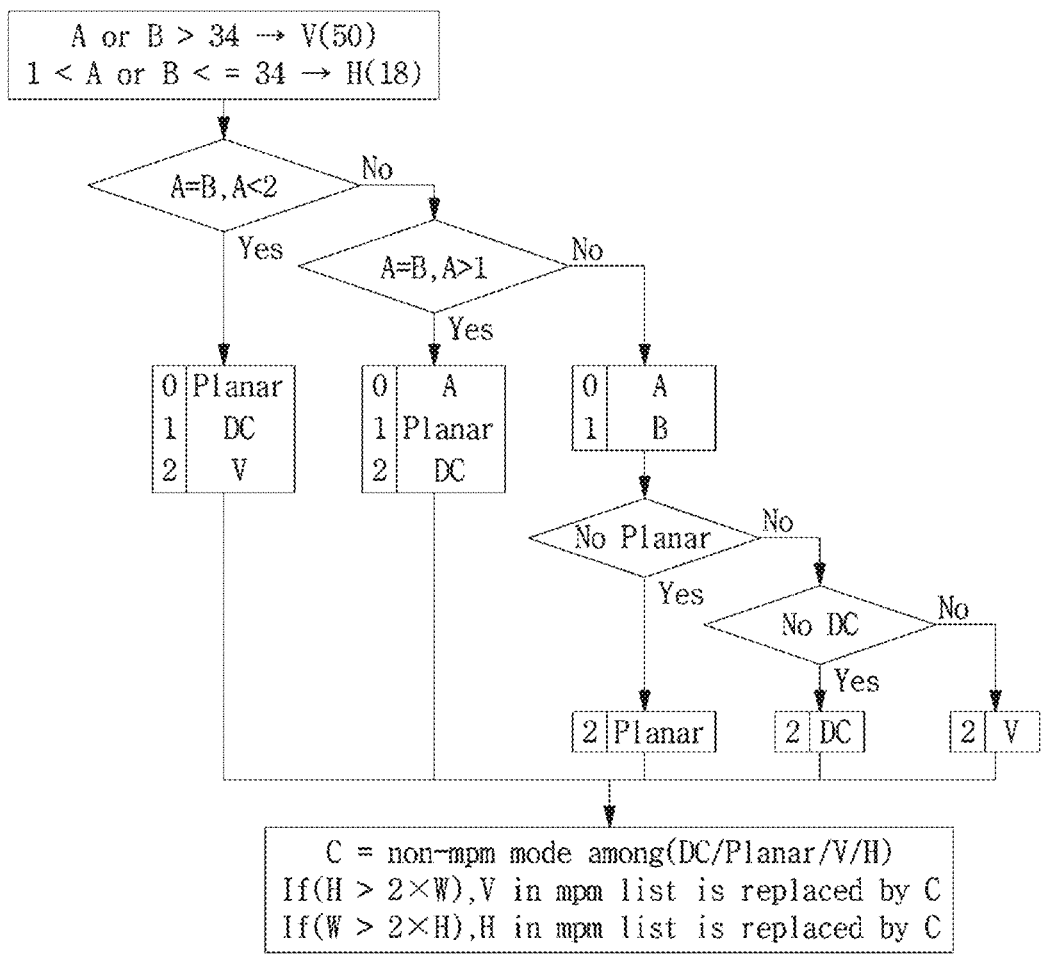
FIG. 19 is a view illustrating a process of signaling an intra prediction mode according to an embodiment of the present invention.

In another example, when the encoding mode of the current block is an inter mode and intra/inter combination prediction is performed (e.g., mh_intra_flag=1), the MPM candidate may be derived and the intra prediction mode of the current block may be derived as in the example of FIG. 18.

Meanwhile, as described above, the MPM list may be constructed and the intra prediction mode may be derived using the same method, regardless of the multi reference sample line related information, the subblock partition prediction information, etc.

When intra/inter combination prediction is performed, the intra prediction mode used for intra prediction may be limited to a predetermined mode. For example, prediction may be performed using one of DC, Planar, Horizontal 18 or Vertical 50.

The intra prediction mode of the current block may be derived using the intra prediction mode A of a block adjacent to the left side of the current block and the intra prediction mode B of a block adjacent to the upper side of the current block.

1) The mode of A and B may be changed to the intra prediction mode available for the current block. For example, when the intra prediction mode of A or B is a vertical mode (e.g., A or B is greater than 34), A or B may be changed to the vertical mode 50. In addition, when the intra prediction mode of A or B is a horizontal mode (e.g., A or B is greater than 1 and is less than or equal to 34), A or B may be changed to a horizontal mode 18.

2) When the intra prediction modes of the changed A and B are the same and are non-directional modes (e.g., a mode less than 2), three MPM candidates may be constructed in the MPM list in the following order: [Planar, DC, Vertical].

3) When A and B are the same and are directional modes (e.g., a mode greater than 1), three MPM candidates may be constructed in the MPM list in the following order. [A, Planar, DC].

4) When A and B are different from each other, two MPM candidates may be constructed in the MPM list in the following order. [A, B].

Additionally, when there is no Planar mode in the MPM list, the Planar mode may be derived as a third candidate mode. Meanwhile, when there is a Planar mode and there is no DC mode in the MPM list, the DC mode may be derived as a third candidate mode. Meanwhile, when there are both a Planar mode and a DC mode in the MPM list, the vertical mode may be derived as a third candidate mode.

A mode, which is not included in the constructed MPM list, among the Planar, DC, horizontal and vertical modes may be assigned as C.

The MPM list may be reconstructed based on the size/shape of the current block. For example, when the height of the current block is greater than twice the width and there is a vertical mode in the list, the vertical mode may be replaced by the C mode. Meanwhile, when the width of the current block is greater than twice the height and there is a horizontal mode in the list, the horizontal mode may be replaced by the C mode.

Under a predetermined condition, only some of the steps of FIG. 18 may be performed.

FIG. 19 is a view illustrating a process of signaling an intra prediction mode according to an embodiment of the present invention.

In another example, when the encoding mode of the current block is an inter mode and intra/inter combination prediction is performed (e.g., mh_intra_flag=1), the intra prediction mode of the current block may be signaled directly without using the MPM list. That is, it is possible to remove complexity for deriving the MPM list.

When intra/inter combination prediction is performed, the intra prediction mode may be signaled as one of DC, Planar, horizontal and vertical modes. For example, as in the example of FIG. 19, in case of mh_intra_flag=1, the intra prediction mode mh_intra_luma_mode may be signaled. The intra prediction mode may be one of the above-described four modes and may be signaled using fixed-length binarization truncated rice binarization. When the mode is signaled using fixed-length binarization, each intra prediction mode may be signaled using two bins. When the mode is signaled using truncated rice binarization, the intra prediction modes are aligned in order of the Planar mode, the DC mode, the vertical mode and the horizontal mode and the Planar mode may be signaled using 1 bin, the DC mode may be signaled using two bins, and the vertical and horizontal modes may be respectively signaled using three bins.

In another example, when the encoding mode of the current block is an inter mode and intra/inter combination prediction is performed (e.g., mh_intra_flag=1), the intra prediction mode of the current block may be fixed to a predetermined mode. That is, one of the DC, Planar, horizontal and vertical modes may be fixed and used. For example, when intra/inter combination prediction is performed, only Planar prediction may be performed as intra prediction and signaling thereof may not be performed.

Meanwhile, the intra prediction mode may be differently derived by combining the multi reference sample line related information (e.g., intra_luma_ref_idx) and intra/inter combination prediction related information (e.g., mh_intra_flag). For example, the intra prediction mode may be derived by combining the steps of FIGS. 12 to 17 and/or FIG. 18.

Based on one or more of the multi reference sample line related information and the subblock partition prediction information, the MPM candidate may be derived and the intra prediction mode of the current block may be derived using one or more of the above-described methods.

For example, when intra prediction is performed using the first reference sample line adjacent to the current block (e.g., intra_luma_ref_idx=0) or when subblock partition prediction is performed (e.g., intra_sub_partition_flag=1), the MPM candidate may be derived as in the example of FIG. 12. Meanwhile, when intra prediction is performed using one of the second reference sample line or higher adjacent to the current block (e.g., intra_luma_ref_idx !=0 or intra_luma_ref_idx>0), the MPM candidate may be derived and the intra prediction mode of the current block may be derived as in the example of FIG. 17.

In another example, the MPM candidate may be derived using the same method regardless of the above-described information. That is, when intra prediction is performed using the first reference sample line adjacent to the current block (e.g., intra_luma_ref_idx=0), when intra prediction is performed using one of the second reference sample lines or higher adjacent to the current block (e.g., intra_luma_ref_idx !=0 or intra_luma_ref_idx>0), or when subblock partition prediction is performed (e.g., intra_sub_partition_flag=1), the MPM candidate may be derived using the same method.

For example, as in the example of FIG. 13, five or six MPM candidates may be derived. At this time, information indicating whether the intra prediction mode of the current block is a non-direction intra prediction mode or a directional intra prediction mode may be preferentially signaled. For example, information indicating whether the intra prediction mode of the current block is a Planar mode (e.g., intra_planar_flag) may be preferentially signaled. In addition, the mode of the current block may be derived by signaling information indicating whether the intra prediction mode of the current block is a Planar mode. For example, when intra_planar_flag is a first value (e.g., 1), the mpm_index may be derived. In addition, when intra_planar_flag is a first value (e.g., 1), five MPM candidates may be derived as in the example of FIG. 13. Meanwhile, intra_planar_flag may be derived based on multi reference sample line related information (e.g., intra_luma_ref_idx). In another example, information indicating the Planar mode/DC mode or the directional mode (e.g., intra_angular_flag) may be preferentially signaled. In addition, when intra_angular_flag is a first value (e.g., 1), as in the example of FIG. 13, the MPM candidate may be derived and, additionally, the intra prediction mode of the current block may be derived based on mpm_flag or mpm_index. Meanwhile, when intra_angular_flag is a second value (e.g., 0), the mode of the current block may be derived by signaling the intra_planar_flag. Alternatively, the MPM candidate may be derived using the method of FIG. 17 instead of FIG. 13. Alternatively, the MPM candidate may be derived using some of the above-described derivation methods.

Meanwhile, the intra_planar_flag or intra_angular_flag may be signaled in case of intra_luma_ref_idx=0 or intra_sub_partition_flag=1.

In another example, five or six MPM candidates may be derived as in the example of FIG. 13. At this time, information indicating whether the intra prediction mode of the current block is a non-directional intra prediction mode or a directional intra prediction mode may be preferentially signaled. That is, when intra_angular_flag is signaled and is 1, as in the example of FIG. 13, the MPM candidate may be derived and the intra prediction mode of the current block may be derived based on mpm_flag or mpm_index. Meanwhile, intra_planar_flag may also be used as information indicating whether the intra prediction mode of the current block is a non-directional intra prediction mode. For example, the mode of the current block may be derived by signaling intra_planar_flag indicating whether the intra prediction mode of the current block is a Planar mode. That is, when intra_planar_flag is a first value (e.g., 1), mpm_index may be derived. In addition, when intra_planar_flag is a first value (e.g., 1), five MPM candidates may be derived as in the example of FIG. 13. Here, intra_planar_flag may indicate whether the intra prediction mode of the current block is a DC mode. Alternatively, the MPM candidate may be derived using the method of FIG. 17 instead of FIG. 13. Alternatively, the MPM candidate may be derived using some of the above-described derivation methods.

In another example, four candidate modes may be derived using the same method. The four candidate modes may be derived using the same method as the example of FIG. 13 and may be four higher modes in the MPM list in FIG. 13. Alternatively, the four candidate modes may be derived using the same method as the example of FIG. 17 and may be four higher modes in the MPM list in FIG. 17. At this time, when intra prediction is performed using the first reference sample line adjacent to the current block (e.g., intra_luma_ref_idx=0) or when subblock partition prediction is performed (e.g., intra_sub_partition_flag=1), MPM indices 0 and 1 may be respectively assigned to the Planar mode and the DC mode and indices 2 to 5 may be assigned to the derived four modes, thereby deriving six MPM candidate modes.

In another example, the MPM candidate may be derived using a combination of some of the above-described methods. For example, as in the example of FIG. 13, six MPM candidates may be derived. At this time, instead of deriving four MPM candidates based on conditions "maxAB−minAB=1" and "maxAB−minAB=2", and "maxAB−minAB>61", four MPM candidates may be derived based on a condition "maxAB−minAB>4" as in the example of FIG. 16.

In another example, the MPM list derived using the same method may be composed of only directional intra prediction modes. That is, the non-directional intra prediction mode (e.g., Planar or DC) may be derived based on at least one of the above-described information and the MPM candidate mode may be derived using the directional intra prediction mode (e.g., an angular mode) regardless of the above-described information.

In another example, the MPM list may be constructed by deriving five MPM candidates. At this time, a predetermined mode may be excluded and the predetermined mode may be a non-directional mode (e.g., Planar or DC mode). When the predetermined mode is a Planar mode, the MPM list may be constructed using the DC mode and the directional mode. For example, the following construction is possible.
1) In a case where the intra prediction modes A and B of the neighbor block are the same and are the directional mode (e.g., the mode greater than 1), five MPM candidates may be constructed in the MPM list in the following order; [A, 2+((A+61)%64), 2+((A−1)%64), DC, 2+((A+60)%64)].
2) In a case where A and B are different from each other and are the directional mode, three MPM candidates may be constructed in the MPM list in the following order. [A, B, DC].

Additionally, the mode having a larger size of A and B may be determined as maxAB, and the mode having a smaller size may be determined as minAB. At this time, when the difference between maxAB and minAB is greater than 1 and is less than 63, the MPM list may be filled with five candidates by adding two MPM candidates [2+((maxAB+61)%64), 2+((maxAB−1)%64] to the MPM list. Meanwhile, when the difference between maxAB and minAB is 1 or is greater than or equal to 63, the MPM list may be filled with five candidates by adding two MPM candidates [2+((maxAB+60)%64), 2+((maxAB) %64] to the MPM list.
3) In a case where A and B are different from each other, one of A and B is a directional mode and the other is a non-directional mode, five MPM candidates may be constructed in the MPM list in the following order [maxAB, DC, 2+((maxAB+61)%64), 2+((maxAB−1) %64, 2+((maxAB+60)%64].
4) In a case other than the above cases, for example, in a case where A and B are the same and are the Planar mode (e.g., a mode less than 1), five MPM candidates may be constructed in the MPM list in the following order. [DC, 50, 18, 46, 54].

Intra prediction may be performed by partitioning the current block into a predetermined number of subblocks based on the size and/or shape of the current block.

For example, when the size of the current block is at least one of 8×8, 4×8 or 8×4, the width or height of the current block may be partitioned into two.

In another example, when the size of the current block is larger than 8×8, the width or height of the current block may be partitioned into four. At this time, information on whether the partitioning direction is a vertical direction or a horizontal direction may be signaled. The width may be partitioned into two or four in case of vertical partition and the height may be partitioned into two or four in case of horizontal partition. For example, when the size of the current block is 32×16 and vertical partition is performed, the width may be partitioned into four, thereby being partitioned into four subblocks each having a size of 8×16.

Meanwhile, information on a type in which the current block is partitioned into subblocks may be signaled from the encoder to the decoder. The information may indicate a direction in which the current block is partitioned. The information may be a flag. For example, the information may include information indicating non-partition, horizontal partition and vertical partition.

In addition, the number of subblocks may be derived based on the information on the type in which the current block is partitioned into subblocks. Alternatively, the number of subblocks may be derived based on the width and height of the current block.

For example, when the information on the type in which the current block is partitioned into subblocks indicates non-partition, the current block may not be partitioned. At this time, information indicating the number of subblocks may be 1.

In another example, when the size of the current block is 4×8, information indicating the number of subblocks may be 2.

In another example, when the size of the current block is 8×4, information indicating the number of subblocks may be 2.

In another example, when the size of the current block is greater than or equal to 8×8, information indicating the number of subblocks may be 4. At this time, the current block may be partitioned in a horizontal direction or a vertical direction.

The current block may mean a luma block.

One intra prediction mode is applicable to the partitioned subblock in the current block. For example, all the plurality of subblocks partitioned in the current block may share the same intra prediction mode. At this time, the intra prediction mode may be determined based on the size of the current block or the size of the subblock.

For example, when the size of the current block 32×8 and the current block is partitioned into four in the vertical direction, the intra prediction mode may be derived based on the size/shape of the current block. For example, when the intra prediction mode signaled with respect to the current block is 2, the mode may be changed to a predetermined mode based on the shape of the current block (e.g., the ratio of the width to the height). Mode 2 may be changed to Mode 67 based on the width of the current block÷the height of the current block. Intra prediction of the partitioned four 8×8 subblocks may be performed using the changed mode.

In another example, when the size of the current block is 32×8 and the current block is partitioned into four in the vertical direction, the intra prediction mode may be derived based on the size/shape of the current block. For example, when the intra prediction mode signaled with respect to the current block is 2, since the shape of the subblock is a square having the same height and width, Mode 2 may be applied without change. That is, intra prediction of the partitioned four 8×8 subblocks may be performed using the intra prediction mode 2. Since the intra prediction mode is changed and derived based on the size/shape of the subblock, the size of the reference sample may be maintained as width×2 and height×2.

In another example, when the size of the current block is 32×32 and the current block is partitioned into four in the horizontal direction, the size of the subblock may be 32×8. At this time, when the intra prediction mode signaled with respect to the current block is 2, Mode 2 may be changed to Mode 67 based on the ratio of the width to the height of the subblock and intra prediction of each subblock may be performed.

The method of changing the intra prediction mode based on the size/shape of the block (e.g., the current block or the subblock) is as follows.

For example, when the following conditions are all satisfied, the intra prediction mode may be changed to predModeIntra=predModeIntra+65.

The width of the block is greater than the height of the block.

predModeIntra is greater than or equal to 2.

predModeIntra is less than (whRatio>1) ? (8+2*whRatio):8, whRatio may be the absolute value of Log 2(width/height).

In another example, when the following conditions are all satisfied, the intra prediction mode may be changed to predModeIntra=predModeIntra−67.

The height of the block is greater than the width of the block.

predModeIntra is less than or equal to 66.

predModeIntra is greater than (whRatio>1) ? (60−2*whRatio):60, whRatio may be the absolute value of Log 2(width/height).

A high priority index in the MPM list may be assigned to a predetermined mode, thereby reducing signaling overhead bits. For example, index 0 or 1 may be assigned to a non-directional mode (e.g., Planar or DC) having a high frequency of occurrence. An index number less than that of the directional mode may be assigned to the non-directional mode. The method of assigning the high priority index to the non-direction mode may be applied to at least one of the above-described MPM derivation methods.

In constructing the MPM list, the MPM candidate mode may be derived by differentiating at least one of the location of a neighbor block, the number of MPM candidate modes or the number of available intra prediction modes. That is, one MPM list may be constructed by constructing a plurality of MPM lists (e.g., two MPM lists) and combining the plurality of MPM lists.

For example, one MPM list may be constructed using the intra prediction mode of the neighbor block at the same location as the example of FIG. 10. Meanwhile, another MPM list may be constructed using the intra prediction modes of the neighbor blocks located at the left and upper sides of the upper left side (e.g., [0, 0]) of the current block.

In another example, one MPM list may be constructed using five candidate modes and another MPM list may be constructed using three candidate modes.

In another example, the candidate modes in one MPM list may be constructed using 66 intra prediction modes, and the candidate modes in another MPM list may be constructed using 35 intra prediction modes. The number of used modes may vary according to the size of the current block and may be at least one of 66, 35, 19 or 11.

In deriving the intra prediction mode of the current block using the MPM list, intra prediction mode information may be signaled. The intra prediction mode information may be at least one of intra_luma_mpm_flag, intra_luma_mpm_idx, intra_luma_mpm_remainder or intra_luma_not_planar_flag. For example, intra_luma_mpm_flag indicating whether there is an intra prediction mode of the current block in the MPM list may be signaled. When the intra_luma_mpm_flag is 1, index information intra_luma_mpm_idx indicating which of the candidate modes in the MPM list may be signaled. In addition, when the intra_luma_mpm_flag is 0, intra_luma_mpm_remainder indicating the intra prediction mode of the current block may be signaled.

Here, intra_luma_not_planar_flag may be an indicator indicating whether the intra prediction mode of the current block is a Planar mode.

At least one of the intra prediction mode information may not be signaled based on at least one of the multi reference sample line related information (e.g., intra_luma_ref_idx), the subblock partition prediction information (e.g., intra_sub_partition_flag, intra_sub_partition_type), or intra/inter combination prediction related information (e.g., mh_intra_flag).

For example, in case of intra_luma_ref_idx !=0, intra_luma_mpm_flag or intra_luma_mpm_remainder may not be signaled. That is, the intra prediction mode of the current block corresponding to the index may be derived by signaling intra_luma_mpm_idx.

In another example, in case of intra_luma_ref_idx !=0, mrl_intra_luma_mpm_idx may be signaled and entropy encoding/decoding different from intra_luma_mpm_idx may be applied. For example, mrl_intra_luma_mpm_idx may signal indices of four MPM candidates and intra_luma_mpm_idx may signal indices of six MPM candidates.

In another example, in case of intra_sub_partition_flag=1, intra_luma_mpm_flag or intra_luma_mpm_remainder may not be signaled. That is, the intra prediction mode of the current block corresponding to the index may be derived by signaling intra_luma_mpm_idx.

In another example, in case of mh_intra_flag=1, the intra prediction mode of the current block may be directly signaled without signaling the intra prediction mode information. For example, the intra prediction mode may be derived by signaling mh_intra_luma_mode.

Meanwhile, the intra prediction mode may be differently derived based on at least one of the multi reference sample line related information (e.g., intra_luma_ref_idx) or intra/inter combination prediction related information (e.g., mh_intra_flag).

Hereinafter, step S802 of constructing the reference sample will be described.

The reference sample for intra prediction may be constructed based on the derived intra prediction mode. In the following embodiments, the current block may mean a prediction block or a subblock having a size/shape smaller than the prediction block. The reference sample may be constructed using one or more reconstructed samples around the current block or a combination thereof. In addition, filtering may be applied to the constructed reference sample.

The number and/or locations of reconstructed sample lnes used to construct the reference sample may vary according to the location of the current sample in the encoding tree block. Each reconstructed sample on a plurality of reconstructed sample lines may be used as a reference sample without change. Alternatively, a predetermined filter may be applied to the reconstructed sample and the reference sample may be generated using the filtered reconstructed sample. The reconstructed samples, to which the filter is applied, may belong to the same reconstructed sample line or different reconstructed sample lines.

The constructed reference sample may be denoted by ref[m, n] and a neighbor reconstructed sample or a sample obtained by filtering the neighbor reconstructed sample may be denoted by rec[m, n]. At this time, m or n may be a predetermined integer value indicating the location of the sample. When the location of the upper left sample location in the current block is (0, 0), the location of the upper left reference sample of the current block may be set to (−1, −1).

In order to construct the reference sample, availability of the neighbor reconstructed sample may be determined. When the neighbor reconstructed sample is located outside at least one of a picture, a slice, a tile or a CTU, it may be determined that the neighbor reconstructed sample is not available. Alternatively, when constrained intra prediction of the current block is performed and the neighbor reconstructed sample is located on the inter encoded/decoded block, it may be determined that the neighbor reconstructed sample is not available.

Upon determining that the neighbor reconstructed sample is not available, the neighbor available reconstructed sample may be used to replace the unavailable sample. For example, starting from the left lower sample, an adjacent available sample may be used to fill the unavailable sample. Alternatively, a combination of available samples may be used to fill the unavailable sample. For example, the average value of available samples located at both ends of the unavailable sample to fill the unavailable sample.

Alternatively, information on the available reference samples may be used to fill the unavailable samples. At this time, the unavailable sample may be filled with an arbitrary value other than an adjacent available sample value. The arbitrary value may be an average value of available sample values or a value considering the gradients of the available sample values. Alternatively, both the average value and the gradient may be used. The gradient may be determined based on a difference between adjacent available samples. Alternatively, the gradient may be determined based on a difference between the average value and the available sample value. In addition to the average value, a maximum value, a minimum value, a median value or a weighted sum using an arbitrary weight may be used. The arbitrary weight may be determined based on a distance between the available sample and the unavailable sample.

The methods may be applied to both the upper and left reference samples or may be applied only in any direction. In addition, the methods may be applied to even the case where the reference sample line of the current block is constructed using a plurality of reconstructed sample lines.

Whether filtering is applied to one or more constructed reference sample may be determined based on at least one of the intra prediction mode of the current block or the size/shape of the block. When filtering is applied, the filter type may vary according to at least one of the intra prediction mode, the size or the shape of the current block.

Hereinafter, step of performing the intra prediction will be described.

Intra prediction of the current block may be performed based on the derived intra prediction mode and/or the reference sample.

In the DC mode, the average value of one or more of the constructed reference samples may be used. At this time, filtering is applicable to one or more prediction samples located at the boundary of the current block. DC prediction may be differently performed based on at least one of the size or shape of the current block. For example, the range of the reference sample used in the DC mode may be specified based on the size and/or shape of the current block.

Figure 20:
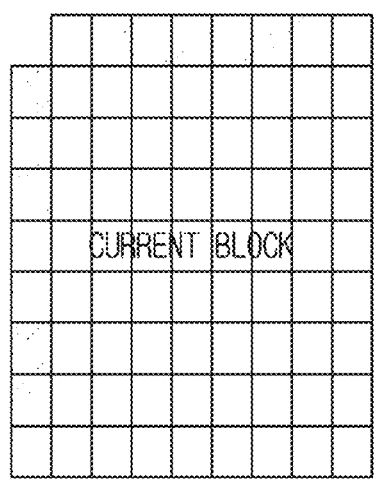
FIG. 20 is a view illustrating DC prediction according to the size and/or shape of a current block according to an embodiment of the present invention.
Figure 20:
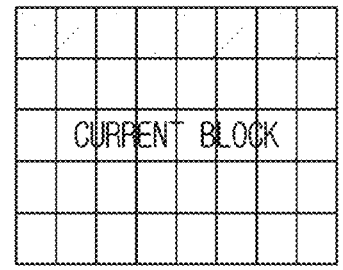

FIG. 20 is a view illustrating DC prediction according to the size and/or shape of a current block according to an embodiment of the present invention.

As shown in (a) of FIG. 20, when the current block has a square shape. DC prediction may be performed using the average value of the upper and left reference samples of the current block.

When the current block has a non-square shape, the neighbor sample adjacent to the left or upper side of the current block may be selectively used. For example, as in the example of (b) of FIG. 20, when the current block has a rectangular shape. DC prediction may be performed using the average value of the reference sample adjacent to the larger size of the width and the height of the current block.

Alternatively, when the size of the current block is a predetermined size or is included in a predetermined range, a predetermined sample may be selected from the upper or left reference sample of the current block and DC prediction may be performed using the average value of the selected sample. The predetermined size may mean a fixed size N×M predefined in the encoder/decoder. N and M are integers greater than 0 and N and M may be the same or different. The predetermined range may mean a threshold for selecting the reference sample of the current block. The threshold may be implemented as at least one of a minimum value or a maximum value. The minimum value and/or the maximum value may be a fixed value predefined in the encoder/decoder and may be a variable value encoded in the encoder and signaled therefrom.

As described above, DC prediction may be performed using the average value of one or more reference samples. Division using the number of reference samples may be performed in order to calculate the average value. When the number of reference samples is $2^n$ (n being a positive integer), the division may be replaced by binary shift operation. In case of a non-square block, when both the upper and left reference samples are used, the number of reference samples may not be $2^n$, and, in this case, shift operation may not be used instead of division. Accordingly, as in the above embodiment, the division may be replaced by shift operation, by using $2^n$ upper or left reference samples.

In case of the Planar mode, a weighted sum considering the distances from one or more constructed reference samples may be used according to the location of the intra prediction target sample of the current block.

In case of a directional mode, one or more reference samples present on a predetermined angle line and in the vicinity thereof may be used at the location of the intra prediction target sample.

In case of location information based intra prediction mode, a reconstructed sample block generated based on location information of encoding/decoding or derivation may be used as the intra prediction block of the current block. Alternatively, the decoder may retrieve and derive the reconstructed sample block to be used as the intra prediction block of the current block.

Intra prediction of the chroma signal may be performed using the reconstructed luma signal of the current block. In addition, intra prediction of another chroma signal Cr may be performed using one reconstructed chroma signal Cb of the current block or a residual signal of Cb.

Intra prediction may be performed by combining the one or more prediction methods. For example, the intra prediction block of the current block may be configured through a weighted sum of a block predicted using a predetermined non-directional intra prediction mode and a block predicted using a predetermined directional intra prediction mode. At this time, the weight may be differently applied according to at least one of the intra prediction mode of the current block, the size of the block or the location of the sample. Alternatively, in case of the chroma block, the intra prediction block of the chroma block may be configured through a weighted sum of a block predicted using a predetermined intra prediction mode and a block predicted using the reconstructed signal of the luma block. At this time, the predetermined intra prediction mode may be one of the modes used to derive the intra prediction mode of the chroma block. In case of the chroma block, as described above, whether a final prediction block is configured using a weighted sum of two prediction blocks may be signaled by encoded information.

In the directional mode, the constructed reference sample may be reconstructed based on the directional prediction mode. For example, when the directional prediction mode refers to a mode in which both the left and upper reference samples are used, a one-dimensional array may be constructed with respect to the left and upper reference sample. Alternatively, the left reference sample may be moved to construct the upper reference sample, and the upper reference sample may be constructed using the weighted sum of one or more left reference samples.

Different directional intra prediction may be performed in predetermined sample group units of the current block. The predetermined sample group unit may be a block, a sub-block, a line or a single sample.

According to an embodiment, cross-color component intra prediction may be performed.

Figure 21:
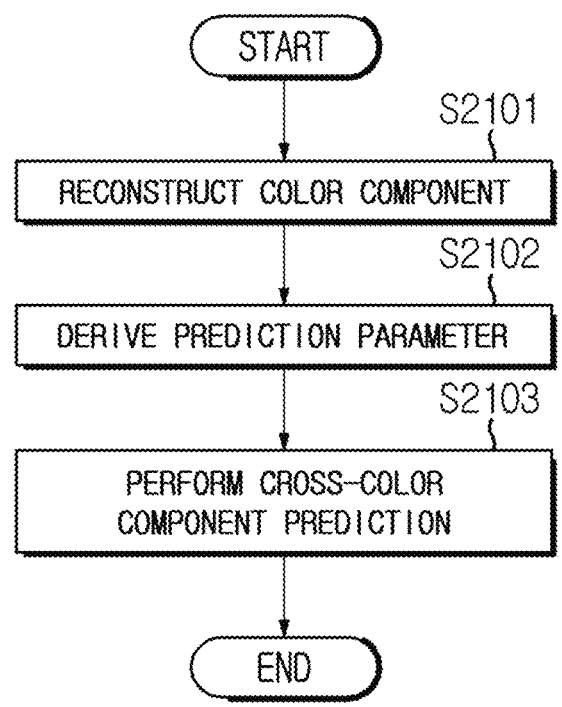
FIG. 21 is a view illustrating a cross-color component intra prediction process according to the present invention.

FIG. 21 is a view illustrating a cross-color component intra prediction process according to the present invention.

According to one embodiment, the cross-color component intra prediction process may include step S2101 of reconfiguring a color component block, step S2102 of deriving a prediction parameter and/or step S2103 of performing cross-color component prediction. The color component may mean at least one of a luma signal, a chroma signal, Red, Green, Blue, Y, Cb or Cr. Prediction of a first color component may be performed using at least one of a second color component, a third color component or a fourth color component. At this time, the signal of the color component used for prediction may be at least one of an original signal, a reconstructed signal, a residual signal or a prediction signal.

When intra prediction is performed with respect to the second color component target block, at least one of the sample of the first color component corresponding block corresponding to the target block and/or the sample of the neighbor block of the corresponding block may be used. For example, when intra prediction is performed with respect to the chroma component block Cb or Cr, the reconstructed luma component block Y corresponding to the chroma component block may be used. Alternatively, when intra prediction is performed with respect to the Cr component block, the Cb component block may be used. Alternatively, when intra prediction is performed with respect to the fourth color component block, a combination of at least one of the first color component block, the second color component block or the third color component block corresponding to the block may be used.

Whether cross-color component intra prediction is performed may be determined based on the size and shape of the current target block or the encoding parameter of the block corresponding to the prediction target block.

For example, whether cross-color component intra prediction is performed may be determined based on at least one of the size or shape of the current target block. For example, when the size of the target block is a CTU size, is equal to or greater than a predetermined size or is in a predetermined size range, cross-color component intra prediction may be performed with respect to the target block.

Alternatively, when the shape of the target block is a predetermined shape, cross-color component intra prediction may be performed with respect to the target block. The predetermined shape may be a square shape. In this case, when the target block has a rectangular shape, cross-color component intra prediction may not be performed. When the predetermined shape is a rectangular shape, the above-described embodiment may be inversely implemented.

1) When the size of the current luma block CTU is less than 64, cross-color component intra prediction may be performed.
2) In the case other than 1), in a dual tree in which the partition structures of the first color component block and the second color component block in one CTU are different cross-color component intra prediction may be performed in the following cases.

For example, when the width and height of the second color component block are 64, cross-color component intra prediction may be performed.

In another example, when the quad-tree partition depth of the second color component block is equal to (the size of the current luma block CTU−6), the shape of a multi-type tree (e.g., a partition tree including a binary tree and a ternary tree) is binary tree partition in the horizontal direction, the width of the second color component current block is 64 and the height of the second color component current block is 32, cross-color component intra prediction may be performed.

In another example, when the quad-tree partition depth of the second color component block is greater than (the size of the current luma block CTU−6), cross-color component intra prediction may be performed.

In another example, when the quad-tree partition depth of the second color component block is equal to (the size of the current luma block CTU−6), the shape of a multi-type tree is binary tree partition in the horizontal direction, and the lower block among the blocks binary-tree partitioned in the horizontal direction is subjected to binary partition in the vertical direction, cross-color component intra prediction may be performed. For example, when quad-tree partition is not performed with respect to the second color component block of 32×32, binary tree partition is performed in the horizontal direction and binary tree partition is performed in the vertical direction with respect to the 32×16 lower block, cross-color component intra prediction may be performed.

3) As in the embodiments of 1) to 2), even if cross-color component intra prediction is performed, cross-color component intra prediction may not be performed in the following cases.

1) When the width and height of the first color component block are 64 and the current block is partitioned into a predetermined number of subblocks, cross-color component intra prediction may not be performed.

2) When the width or height of the first color component block is less than 64 and the quad-tree partition depth of the first color component block is equal to (the size of the current luma block CTU−6), cross-color component intra prediction may not be performed.

Here, the first color component block may mean a luma block and the second color component block may mean a chroma block.

In another example, whether cross-color component intra prediction is performed may be determined based on the encoding parameter of at least one of a corresponding block corresponding to a prediction target block or a neighbor block of the corresponding block. For example, when the corresponding block is subjected to inter prediction under the constrained intra prediction (CIP) environment, cross-color component intra prediction may not be performed. Alternatively, when the intra prediction mode of the corresponding block corresponds to a predetermined mode, cross-color component intra prediction may be performed. Alternatively, whether cross-color component intra prediction is performed may be determined based on at least one of CBF information of the corresponding block and the neighbor block. The encoding parameter is not limited to the prediction mode of the block and the above-described various parameters which may be used for encoding/decoding may be used.

Hereinafter, the step of reconfiguring the color component block will be described.

When the second color component block is predicted using the first color component block, the first color component block may be reconstructed. For example, when the color space of an image is YCbCr and the ratio between color components is one of 4:4:4, 4:2:2 and 4:2:0, the size of the block between color components may be different. Accordingly, when the second color component block is predicted using first color component blocks having different sizes, the first color component block may be reconstructed in order to equalize the sizes of the two blocks. At this time, the reconstructed block may include at least one of the sample of the first color component corresponding block or the sample of the neighbor block.

In the above-described step of configuring the reference sample, an indicator corresponding to a predetermined line among a plurality of reference sample lines may be signaled. At this time, in the reconfiguration process, reconfiguration may be performed using a predetermined line corresponding to the signaled indicator.

For example, when the indicator (e.g., mrl_idx) is 3, reconfiguration may be performed using the fourth reference sample line adjacent to the first color component corresponding block. At this time, when reconfiguration is performed using two or more reference sample lines, the third reference sample line may be additionally used.

In another example, when the indicator is 1, reconfiguration may be performed using the second reference sample line adjacent to the first color component corresponding block.

A reference sample line not signaled by the indicator may not be used in the reconfiguration method. For example, when the indicator signals one of the first, second and fourth reference sample lines, the third reference sample line may not be used in the reconfiguration process. That is, in performing intra prediction, the sample corresponding to the third reference sample line may not be accessed and retrieved from the memory.

The method of using the indicator in the reconfiguration process may be used when the partition structures of the first color component block and the second color component block are the same. For example, when the first color component block and the second color component block in one CTU has a single tree partition structure, the indicator-based reconfiguration process may be performed.

When at least one of the boundary of the second color component target block or the boundary of the corresponding first color component corresponding block corresponds to the boundary of a predetermined region, the reconfiguration process may be performed by differently selecting the reference sample used for reconfiguration. At this time, the number of upper reference sample lines and the number of left reference sample lines may be different from each other. The predetermined region may be at least one of a picture, a slice, a tile, a CTU, or a CU, for example.

For example, when the upper boundary of the first color component corresponding block corresponds to the boundary of the predetermined region, reconfiguration may be performed using only the left reference sample without using the upper reference sample.

In another example, when the left boundary of the first color component corresponding block corresponds to the boundary of the predetermined region, reconfiguration may be performed using only the upper reference sample, without using the left reference sample.

In another example, N upper reference sample lines and M left reference sample lines may be used. At this time, N may be less than M. For example, when the upper boundary corresponds to the boundary of the predetermined region, N may be 1 and, when the left boundary corresponds to the boundary of the predetermined region, M may be 1.

Alternatively, regardless of whether to correspond to the boundary of the predetermined region, reconfiguration may be performed using the N upper reference sample lines and/or M left reference sample lines of the first color component corresponding block.

Hereinafter, the step of deriving the prediction parameter will be described.

The prediction parameter may be derived using at least one of the reference sample of the reconstructed first color component corresponding block or the reference sample of the second color component prediction target block. Hereinafter, the first color component and the first color component block may mean the reconstructed first color component and the reconstructed first color component block, respectively.

For example, the prediction parameter may be derived by adaptively using the reference sample of the reconstructed first color component based on the intra prediction mode of the first color component corresponding block. At this time, the reference sample of the second color component may also be adaptively used based on the intra prediction mode of the first color component corresponding block.

Hereinafter, the step of performing cross-color component prediction will be described.

As described above, when the prediction parameter is derived, cross-color component intra prediction may be performed using at least one of the derived prediction parameters.

The cross-color component prediction method may be applied to the inter prediction mode.

When the encoding mode of the first color component is an inter mode, cross-color component prediction may be performed with respect to the second color component. For example, in performing of inter prediction of the current block, inter prediction may be performed with respect to the first color component and cross-color component prediction may be performed with respect to the second color component. For example, the first color component may be a luma component and the second color component may be a chroma component.

Cross-color component prediction may be performed using a prediction sample or a reconstructed sample of the luma component. For example, after inter prediction is performed with respect to the luma component, prediction may be performed with respect to the chroma component by applying a cross-color component prediction parameter to the prediction sample. At this time, the prediction sample may mean a sample subjected to at least one of motion compensation, motion correction, overlapped block motion compensation (OBMC) or bi-directional optical flow (BIO).

Cross-color component prediction may be adaptively performed according to the encoding parameter of the first color component. For example, whether cross-color component prediction is performed may be determined according to CBF information of the first color component. The CBF information may indicate whether a residual signal is present. That is, when the CBF of the first color component is 1, cross-color component prediction may be performed with respect to the second color component. Meanwhile, when the CBF of the first color component is 0, inter prediction may be performed with respect to the second color component, without performing cross-color component prediction.

A flag indicating whether cross-color component prediction is performed may be signaled. For example, the flag may be signaled in units of CU or PU.

When the encoding parameter of the first color component satisfies a predetermined condition, the flag indicating whether cross-color component prediction is performed may be signaled. For example, when the CBF of the first color component is 1, the flag may be signaled to determine whether cross-color component prediction is performed.

In performing the cross-color component prediction with respect to the second color component, inter motion prediction or compensation value of the second color component may be used. For example, inter motion prediction or compensation of the second color component may be performed using inter prediction information of the first color component, and prediction may be performed via a weighted sum of an inter motion compensation value and a cross-color component prediction value of the second color component.

Alternatively, when the inter prediction mode of the current block is a merge mode, prediction of the second color component of the current block may be performed via a weighted sum of a value predicted using motion information corresponding to a merge index and a value predicted by performing cross-color component prediction. At this time, the first color component block used to perform cross-color component prediction may be at least one of a value predicted or reconstructed by performing inter prediction (e.g., merge mode). The weight for the weighted sum may be 1:1.

Filtering may be applied to the prediction sample generated by performing intra prediction.

Filtering applied to the prediction sample may be performed based on at least one of the intra prediction mode of the current block, the size/shape of the current block, the reference sample line or inter and intra combination prediction (e.g., inter_intra_flag). For example, when at least one of the intra prediction mode or the size/shape of the current block satisfies a predetermined condition, whether filter is applied or the filter type may be determined. The filter type may be at least one of a filter tap, a filter coefficient or a filter shape.

For example, when the intra prediction mode of the current block corresponds to at least one of a DC mode, a Planar mode or a predetermined directional mode, filtering is applicable to the prediction sample. The predetermined directional mode may be at least one of a vertical mode (Mode 2) to Mode 66. Alternatively, the predetermined directional mode may be a mode less than or equal to Mode 18 and a mode greater than or equal to Mode 50. Meanwhile, when the intra prediction mode corresponds to at least one of Mode−1 to Mode−10 or Mode 67 to Mode 76, filtering may not be applied to the prediction sample.

In another example, the number of filter taps may vary according to the intra prediction mode. When the intra prediction mode is a DC mode, a 4-tap filter is applicable. When the intra prediction mode corresponds to at least one of a Planar mode, a horizontal mode, a vertical mode or a diagonal mode, a 3-tap filter is applicable. When the intra prediction mode corresponds to a predetermined directional mode, a 2-tap filter is applicable. The number of filter taps may be changed by setting one or more filter coefficients to 0.

In another example, when the intra prediction mode of the current block is a predetermined directional mode, a filter having a fixed number of filter taps is applicable. That is, the number of filter taps may not be changed regardless of the x or y coordinate of the prediction sample, to which filtering is applied, included in the current block. For example, when the intra prediction mode of the current block is at least one of a mode less than Mode 18 or a mode greater than Mode 50, a filter having a fixed number of filter taps is applicable. The number may be 2.

In this case, operation of determining whether each predetermined value derived based on the location of the prediction sample, to which filtering is applied, is in a predetermined range may not be performed. In addition, operation of changing the number of filter taps based on operation of determining whether the predetermined value is in the predetermined range may not be performed.

In another example, when the size/shape of the current block satisfies a predetermined condition, filtering is applicable to the prediction sample. For example, when the width is less than 64 and the height is less 64, filtering is applicable. Alternatively, when an average value of the log value of the width and the log value of the height is less than 6, filtering is applicable. Alternatively, when the width is equal to or greater than 4 and the height is equal to or greater than 4, or when the current block is not a luma block, filtering is applicable.

In another example, when the shape of the current block is a rectangular shape (e.g., the width and the height are different), whether filtering is applied to the prediction sample may be determined based on comparison between the width and the height and a ratio of the width to the height. When the shape of the current block is a rectangular shape and the intra prediction mode corresponds to a predetermined mode, filtering may not be applied. For example, when the width is twice as the height and the intra prediction mode corresponds to at least one of Mode 2 to Mode 7, filtering may not be applied.

In another example, the number of lines of the prediction sample, to which the filter is applied, may vary according to at least one of the intra prediction mode or the size/shape of the block. The line of the prediction sample may mean a prediction sample line adjacent to a reference sample. For example, when the size of the block is less than a predetermined size, the filter is applied to N prediction sample lines and, when the size of the block is greater than the predetermined size, the filter is applied to M lines. For example, the filter may be applied to six prediction sample lines when the size of the current block is 32×32 and may be applied to three prediction sample lines when the size of the current block is 4×4. The number of prediction sample lines may differ between the horizontal and vertical directions.

In another example, filtering may be applied to the prediction sample based on the reference sample line used for prediction. For example, when the reference sample used to perform prediction corresponds to a first reference sample line (e.g., mrl_idx=0) or when the current block is not a luma block, filtering of the prediction sample may be performed based on the intra prediction mode of the current block and the size/shape of the block. Meanwhile, when the reference sample used for prediction corresponds to at least one of second to fourth reference sample lines (e.g., mrl_idx !=0), filtering of the prediction sample may not be performed.

In another example, when prediction is performed by combining inter prediction and intra prediction (e.g., inter_intra_flag=1), filtering may not be applied to the intra prediction sample. Since combination prediction is performed by applying a weight to the inter prediction value and intra prediction value, it is possible to reduce complexity and improve prediction efficiency, by not applying filtering to intra prediction sample.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks: and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
obtaining a flag indicating whether an intra prediction mode of a current block is not a planar mode from a bitstream;
deriving the intra prediction mode of the current block based on the flag;
generating a reference sample of the current block; and
predicting the current block based on the intra prediction mode of the current block and the reference sample,
wherein, in response to the flag indicating that the intra prediction mode of the current block is not the planar mode, the intra prediction mode of the current block is derived based on the MPM list,
wherein, in response to the flag indicating that the intra prediction mode of the current block is the planar mode, the intra prediction mode of the current block is derived as the planar mode without deriving the MPM list,
wherein the MPM list is derived based on a comparison of a first intra prediction mode candidate and a second intra prediction mode candidate,
wherein the first intra prediction mode candidate is derived based on a left intra prediction mode of a left neighbor block of the current block,
wherein the second intra prediction mode candidate is derived based on a top intra prediction mode of a top neighbor block of the current block,
wherein a number of intra prediction mode candidates of the MPM list is fixed as 5, and
wherein, in response to the first intra prediction mode candidate being equal to the second intra prediction mode candidate and both of an index value of the first intra prediction mode candidate and an index value of the second intra prediction mode candidate being smaller than or equal to 1, the MPM list is composed of a DC mode, a vertical directional mode, a horizontal directional mode, an intra prediction mode with index of 46 and an intra prediction mode with index of 54.

2. The method of claim 1, wherein the current block is partitioned into a predetermined number of subblocks based on at least one of a size and a shape of the current block.

3. A method of encoding an image, the method comprising:
determining whether an intra prediction mode of a current block is not a planar mode,
determining the intra prediction mode of the current block based on whether the intra prediction mode of the current block is not the planar mode;
generating a reference sample of the current block; and
predicting the current block based on the intra prediction mode and the reference sample,
wherein a flag indicating whether the intra prediction mode of the current block is not the planar mode is encoded into a bitstream,
wherein, in response to the intra prediction mode of the current block being not the planar mode, the intra prediction mode of the current block is derived based on the MPM list,
wherein, in response to the intra prediction mode of the current block being the planar mode, the intra prediction mode of the current block is derived as the planar mode without deriving the MPM list,
wherein the MPM list is derived based on a comparison of a first intra prediction mode candidate and a second intra prediction mode candidate,
wherein the first intra prediction mode candidate is derived based on a left intra prediction mode of a left neighbor block of the current block,
wherein the second intra prediction mode candidate is derived based on a top intra prediction mode of a top neighbor block of the current block,
wherein a number of intra prediction mode candidates of the MPM list is fixed as 5, and
wherein, in response to the first intra prediction mode candidate being equal to the second intra prediction mode candidate and both of an index value of the first intra prediction mode candidate and an index value of the second intra prediction mode candidate being smaller than or equal to 1, the MPM list is composed of a DC mode, a vertical directional mode, a horizontal directional mode, an intra prediction mode with index of 46 and an intra prediction mode with index of 54.

4. A non-transitory computer-readable recording medium storing a bitstream that is generated by an image encoding method, the method comprising:
determining whether an intra prediction mode of a current block is not a planar mode,
determining the intra prediction mode of the current block based on whether the intra prediction mode of the current block is not the planar mode;
generating a reference sample of the current block; and
predicting the current block based on the intra prediction mode and the reference sample,
wherein a flag indicating whether the intra prediction mode of the current block is not the planar mode is encoded into the bitstream,
wherein, in response to the intra prediction mode of the current block being not the planar mode, the intra prediction mode of the current block is derived based on the MPM list,
wherein, in response to the intra prediction mode of the current block being the planar mode, the intra prediction mode of the current block is derived as the planar mode without deriving the MPM list, wherein the MPM list is derived based on a comparison of a first intra prediction mode candidate and a second intra prediction mode candidate,
wherein the first intra prediction mode candidate is derived based on a left intra prediction mode of a left neighbor block of the current block,
wherein the second intra prediction mode candidate is derived based on a top intra prediction mode of a top neighbor block of the current block,
wherein a number of intra prediction mode candidates of the MPM list is fixed as 5, and
wherein, in response to the first intra prediction mode candidate being equal to the second intra prediction mode candidate and both of an index value of the first intra prediction mode candidate and an index value of the second intra prediction mode candidate being smaller than or equal to 1, the MPM list is composed of a DC mode, a vertical directional mode, a horizontal directional mode, an intra prediction mode with index of 46 and an intra prediction mode with index of 54.

* * * * *